(12) United States Patent
Chen et al.

(10) Patent No.: US 12,368,201 B2
(45) Date of Patent: Jul. 22, 2025

(54) END COVER ASSEMBLY, BATTERY CELL, BATTERY, POWER CONSUMPTION DEVICE AND LIQUID INJECTION METHOD

(71) Applicant: CONTEMPORARY AMPEREX TECHNOLOGY (HONG KONG) LIMITED, Hong Kong (CN)

(72) Inventors: Xinxiang Chen, Fujian (CN); Yulian Zheng, Fujian (CN); Shoujun Huang, Fujian (CN); Peng Wang, Fujian (CN); Wei Li, Fujian (CN)

(73) Assignee: CONTEMPORARY AMPEREX TECHNOLOGY CO., LIMITED, Hong Kong (CN)

( * ) Notice: Subject to any disclaimer, the term of this patent is extended or adjusted under 35 U.S.C. 154(b) by 775 days.

(21) Appl. No.: 17/564,989

(22) Filed: Dec. 29, 2021

(65) Prior Publication Data
US 2022/0131218 A1  Apr. 28, 2022

Related U.S. Application Data

(63) Continuation of application No. PCT/CN2020/112983, filed on Sep. 2, 2020.

(51) Int. Cl.
*H01M 50/184* (2021.01)
*F16J 15/06* (2006.01)
(Continued)

(52) U.S. Cl.
CPC ......... *H01M 50/184* (2021.01); *F16J 15/062* (2013.01); *F16J 15/104* (2013.01);
(Continued)

(58) Field of Classification Search
CPC .................................................. H01M 50/645
See application file for complete search history.

(56) References Cited

U.S. PATENT DOCUMENTS

| 11,114,716 B1 | 9/2021 | Chen et al. |
| 2013/0034757 A1 | 2/2013 | Doyle |

(Continued)

FOREIGN PATENT DOCUMENTS

| CN | 2788363 Y | 6/2006 |
| CN | 205069696 U | 3/2016 |

(Continued)

OTHER PUBLICATIONS

Machine translation of JP 2014-099266 A (Year: 2014).*
(Continued)

*Primary Examiner* — Robert S Carrico
(74) *Attorney, Agent, or Firm* — Andrew M. Calderon; Calderon Safran & Wright P.C.

(57) ABSTRACT

The present application relates to an end cover assembly, a battery cell, a battery, a power consumption device and a liquid injection method. The end cover assembly includes an end cover, a sealing piece and a cover body, wherein the end cover is provided with a first hole for injecting electrolyte; the sealing piece is configured to seal the first hole; the cove body is configured to cover at least part of the sealing piece, the cover body is rotatable relative to the end cover to realize detachable connection between the cover body and the end cover; one of the sealing piece and the cover body is provided with a second hole, the other one of the sealing piece and the cover body is provided with a boss; the boss is inserted into the second hole, and the boss and the second hole are relatively rotatable.

13 Claims, 10 Drawing Sheets

(51) Int. Cl.
*F16J 15/10* (2006.01)
*H01M 50/15* (2021.01)
*H01M 50/186* (2021.01)
*H01M 50/645* (2021.01)

(52) U.S. Cl.
CPC ......... *H01M 50/15* (2021.01); *H01M 50/186* (2021.01); *H01M 50/645* (2021.01); *H01M 2220/20* (2013.01)

(56) References Cited

U.S. PATENT DOCUMENTS

| | | | |
|---|---|---|---|
| 2014/0186686 A1* | 7/2014 | Takahashi | H01M 50/70 429/246 |
| 2021/0036379 A1 | 2/2021 | Zhou et al. | |
| 2022/0352583 A1 | 11/2022 | Chen et al. | |

FOREIGN PATENT DOCUMENTS

| | | |
|---|---|---|
| CN | 205752280 U | 11/2016 |
| CN | 207040871 U | 2/2018 |
| CN | 207320226 U | 5/2018 |
| CN | 208336404 U | 1/2019 |
| CN | 209515844 U | 10/2019 |
| CN | 209786066 U | 12/2019 |
| CN | 111490192 A | 8/2020 |
| JP | 34-2133 Y | 2/1959 |
| JP | 2001313022 A | 11/2001 |
| JP | 2002083583 A | 3/2002 |
| JP | 2007257942 A | 10/2007 |
| JP | 2014099266 A | 5/2014 |
| WO | 2018024213 A | 2/2018 |
| WO | 2018048160 A1 | 3/2018 |

OTHER PUBLICATIONS

Office Action issued in corresponding Chinese Patent Application No. 202080085020.7 on Aug. 29, 2023; 35 pages.
Office Action issued in corresponding JapanesePatent Application No. 2022-561416 on Nov. 27, 2023; 6 pages.
International Search report issued in the corresponding Application PCT/CN2020/112983 on Jun. 8, 2021.
European Search Report issued in related European Patent Application No. 20941520.7 on Sep. 12, 2022.

* cited by examiner

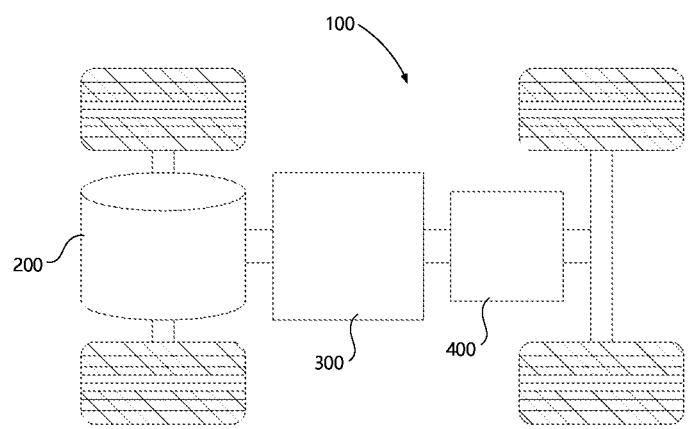
FIG. 1-A
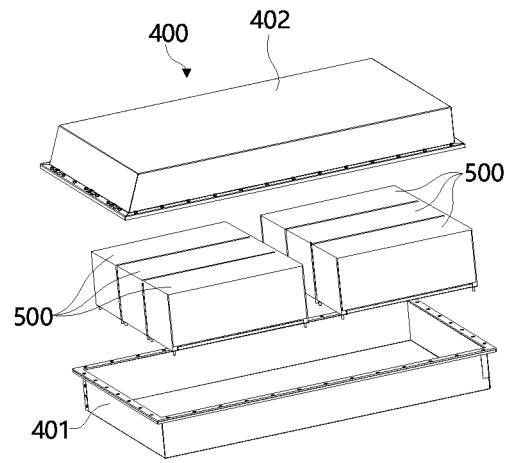
FIG. 1-B
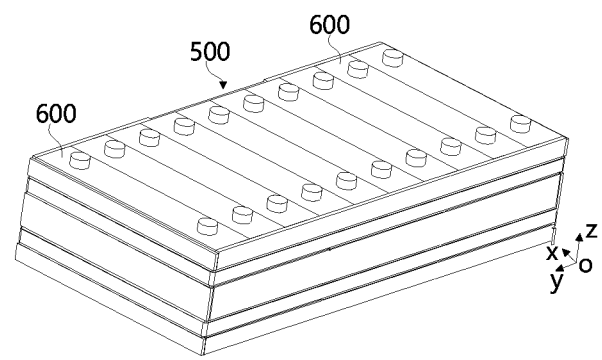
FIG. 1-C
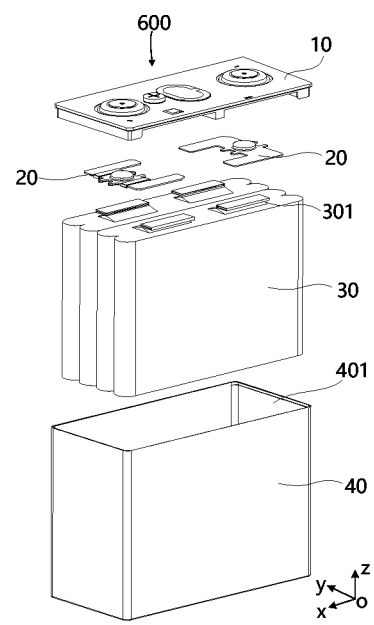
FIG. 1-D

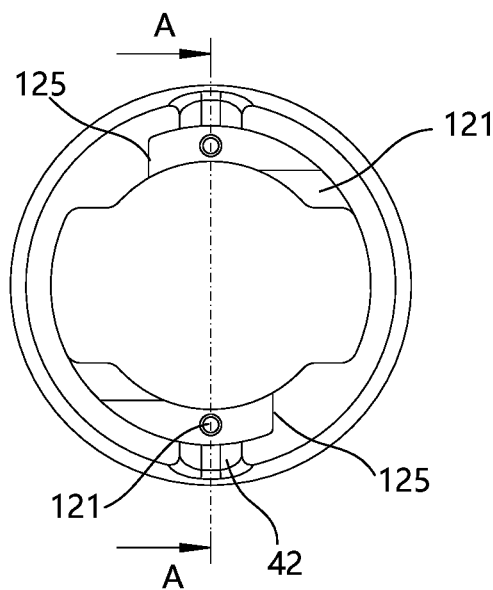
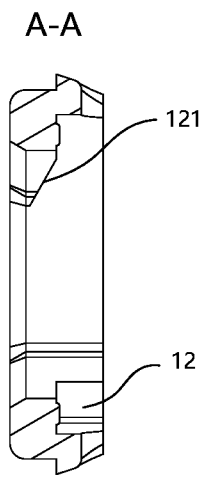
FIG. 21A          FIG. 21B
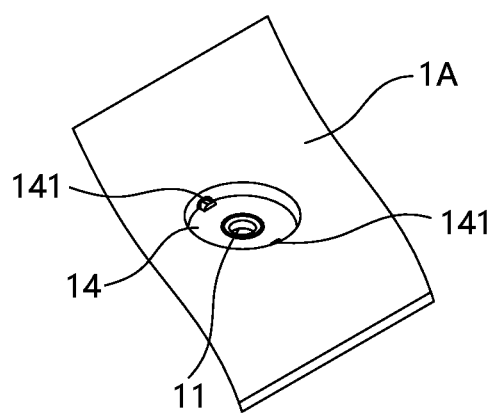
FIG. 22

END COVER ASSEMBLY, BATTERY CELL, BATTERY, POWER CONSUMPTION DEVICE AND LIQUID INJECTION METHOD

TECHNICAL FIELD

The present application relates to the technical field of batteries, and in particular to an end cover assembly, a battery cell, a battery, a power consumption device and a liquid injection method.

BACKGROUND

Lithium ion batteries have the advantages of high energy density, high power density, numerous recycling times and long storage time, and have been widely used in electrical vehicles.

How to prolong the battery life of the electrical vehicles has always been a difficult problem in the industry.

SUMMARY

An objective of the present application is to provide a battery cell with improved performance.

According to a first aspect of the present application, an end cover assembly is provided. The end cover assembly is applied to a battery cell and includes:

an end cover, provided with a first hole for injecting electrolyte;

a sealing piece, configured to seal the first hole; and a cover body, configured to cover at least part of the sealing piece, the cover body being rotatable relative to the end cover to realize detachable connection between the cover body and the end cover, wherein one of the sealing piece and the cover body is provided with a second hole, and the other one of the sealing piece and the cover body is provided with a boss; and boss is configured to be inserted into the second hole, and the boss and the second hole are relatively rotatable to realize rotatable connection between the sealing piece and the cover body.

Through connection between the sealing piece and the cover body, when opening or closing the first hole, the sealing piece and the cover body can be disassembled or mounted as a whole, so that operation steps are simplified, operation time is shortened, and operation efficiency is improved.

In some embodiments, the boss is connected to the second hole in an interference fit.

Through the interference fit between the boss and the second hole, the sealing piece and the cover body can be connected, and a rotation can occur between the sealing piece and the cover body. Rotatable connection between the sealing piece and the cover body is realized through an interference fit manner, so that it is unnecessary to introduce new parts or new structures, and the manufacturing cost is reduced.

In some embodiments, the boss includes a first inserting portion, a first accommodating portion is formed on a hole wall of the second hole, and the first inserting portion is accommodated in the first accommodating portion to limit separation between the sealing piece and the cover body.

Through disposing the first inserting portion and the first accommodating portion, the first inserting portion being inserted into the first accommodating portion, through fit between the first inserting portion and the first accommodating portion, separation between the sealing piece and the cover body can be limited, thereby ensuring stable connection between the sealing piece and the cover body.

In some embodiments, in a direction perpendicular to an axis of the second hole, a cross-sectional area of the first accommodating portion gradually increases in a direction away from an inserted end of the second hole, and the first inserting portion is fitted with the first accommodating portion to limit separation between the sealing piece and the cover body.

The cross-sectional area of the first accommodating portion gradually increases in a direction away from the inserted end of the second hole, which may increase the difficulty that the first inserting portion is separated from the first accommodating portion, so that separation between the sealing piece and the cover body is limited.

In some embodiments, the second hole is a blind hole.

This structure can effectively prevent impurities from entering the battery cell through the second hole, and can also effectively prevent the electrolyte in the battery cell from leaking through the second hole.

In some embodiments, the sealing piece and the end cover are relatively fixed in a peripheral direction of the first hole.

The sealing piece and the end are maintained to be relatively fixed in a peripheral direction, so that rotation of the sealing piece relative to the end cover along with the cover body can be avoided when the cover body rotates relative to the end cover, thereby reducing the abrasion between the sealing piece and the end cover, and reducing the influence on the sealing effect.

In some embodiments, a rotation axis of the cover body relative to the sealing piece is collinear with an axis of the first hole.

If the rotation axis of the cover body relative to the sealing piece is not collinear with the axis of the first hole, when the cover body rotates relative to the sealing piece, the cover body may drive the sealing piece to rotate due to eccentricity and induce a friction between the sealing piece and the end cover, so by configuring the rotation axis of the cover body relative to the sealing piece to be collinear with the axis of the first hole, it can be effectively ensured that the sealing piece does not rotate with the cover body when the cover body rotates relative to the end cover, thereby reducing friction between the sealing piece and the end cover.

In some embodiments, the sealing piece includes a sealing column inserted into the first hole. The sealing piece effectively seals the first hole through the sealing column so as to prevent electrolyte from leaking and impurities from entering.

In some embodiments, the sealing column is a non-rotating body, and a shape of the first hole is fitted with the sealing piece.

The sealing column is set to be a non-rotating body, thereby effectively ensuring relative fixation between the sealing piece and the end cover and preventing abrasion caused by relative rotation between the sealing piece and the end cover.

In some embodiments, the sealing column is in interference fit with the first hole.

The fit between the sealing column and the first hole is set to be the interference fit, so that the difficulty of rotating the sealing column in the first hole can be increased, and the sealing piece and the end cover are relatively fixed.

In some embodiments, the boss is in the interference fit with the second hole, and a friction coefficient of a contact surface between the sealing column and the first hole is greater than a friction coefficient of a contact surface between the boss and the second boss.

In some embodiments, the sealing piece further includes an anti-thrust platform connected to the sealing column, the anti-thrust platform is located between the cover body and the end cover, and the anti-thrust platform is fitted with an end face of the first hole.

When there is the interference fit both between the sealing column and the first hole, and between the boss and the second hole, and the friction coefficient of the contact surface between the sealing column and the first hole is set to be greater than the friction coefficient of the contact surface between the boss and the second hole, when an external force applied to the cover body can make the cover body rotate relative to the sealing piece, the external force will not be enough to make the sealing piece rotate relative to the end cover, thus ensuring relative fixation between the sealing piece and the end cover, and reducing abrasion between the sealing piece and the end cover.

In some embodiments, the boss is a rotating body. This structure is beneficial for realizing rotation of the boss in the second hole.

In some embodiments, the end cover is provided with a second accommodating portion arranged in a circumferential direction of the first hole, the second accommodating portion is configured to accommodate at least part of the cover body to limit the position of the cover body, and the second accommodating portion is located on one side of the end cover away from an inner portion of the battery cell.

The second accommodating portion may accommodate part of the cover body to limit the cover body, thereby limiting a degree of freedom of the cover body in its height direction, preventing separation between the cover body and the end cover, thus realizing relative fixation between the cover body and the end cover. Meanwhile, the cover body may also at least partially cover the sealing piece, so after the degree of freedom of the cover body in the height direction is limited by the end cover, the sealing piece is pressed and covered under the cover body, and the fixation of the sealing piece is also realized.

In some embodiments, the cover body is rotatable relative to the end cover and includes a limiting portion; when the cover body rotates to a first position, the limiting portion is located in the second accommodating portion to limit separation between the cover body and the end cover; and when the cover body rotates to a second position, the limiting portion and the second accommodating portion are staggered in the circumferential direction of the first hole to realize separation between the cover body and the end cover. The limiting portion is set to be fitted with the second accommodating portion, so that the end cover and the cover body are detachably connected.

In some embodiments, the boss and the second hole are configured to be relatively rotatable at least during the process that the cover body rotates from the first position to the second position.

In some embodiments, the end cover further includes a guide portion communicating with the second accommodating portion; and the limiting portion is configured to enter the second accommodating portion through the guide portion, or be separated from the end cover through the guide portion.

Through disposing the guide portion, the limiting portion may enter the second accommodating portion or be separated more smoothly, so that the operation convenience and the operation efficiency can be improved.

In some embodiments, the end cover includes an end cover body and a mounting part; the mounting part is arranged at a surface between the end cover body and is arranged around the first hole; and the second accommodating portion is arranged at the mounting part, or the mounting part and the end cover body enclose to form the second accommodating portion.

In some embodiments, the sealing piece includes a sealing column inserted into the first hole; an end of the sealing column close to an inner portion of the battery cell is provided with a guide inclined surface; and a length of the guide inclined surface in an axis direction of the first hole is greater than a length of the mounting part in the axis direction of the first hole.

Since the end cover has a thin plate-shaped and difficult-to-process structure, the formation of the second accommodating portion can be facilitated through arranging the mounting part, so that the processing difficulty of the end cover can be reduced.

According to a second aspect of the present application, a shell assembly is provided. The shell assembly is applied to a battery cell and includes:

a shell, configured to be connected to the end cover to form an outer shell of the battery cell, the shell being provided with a first hole for injecting electrolyte;

a sealing piece, configured to seal the first hole; and a cover body, configured to cover at least part of the sealing piece, the cover body being rotatable relative to the end cover to realize detachable connection between the cover body and the end cover, wherein one of the sealing piece and the cover body is provided with a second hole, and the other one of the sealing piece and the cover body is provided with a boss; the boss is configured to be inserted into the second hole, and the boss and the second hole are relatively rotatable to realize rotatable connection between the sealing piece and the cover body.

According to a third aspect of the present application, a battery cell is provided. The battery cell includes:

an electrode assembly and an outer shell for accommodating the electrode assembly, wherein the outer shell includes a shell and the end cover assembly as defined above, an end of the shell is provided with an opening, and the end cover assembly covers the opening at the end of the shell; or an electrode assembly and an outer shell for accommodating the electrode assembly, wherein the outer shell includes an end cover and the shell assembly as defined above, and the end cover covers the opening at the end of the shell.

According to a fourth aspect, a battery is provided. The battery includes a plurality of the battery cells.

According to a fifth aspect of the present application, a power consumption device is provided. The power consumption device includes the above battery cell, wherein the battery cell is configured to provide electric energy.

According to a sixth aspect of the present application, a liquid injection method for a battery cell is provided. The liquid injection method for the battery cell includes:

injecting electrolyte through a first hole on an outer shell of the battery cell;

taking a sealing piece and a cover body which are kept in a connected state to the first hole, sealing the first hole by the sealing piece while keeping the sealing piece and the cover body in the connected state, and covering at least part the sealing piece through the cover body; and rotating the cover body relative to the sealing piece to realize relative fixation between the cover body and the outer shell.

In some embodiments, the liquid injection method for the battery cell further includes:

removing the cover body and the sealing piece which are kept in the connected state from the outer shell.

In some embodiments, the sealing piece is provided with a second hole, the cover body is provided with a boss, the boss is inserted into the second hole, and the second hole is a blind hole. Before the electrolyte is injected through the first hole in the outer shell of the battery cell, the liquid injection method further includes:

piercing a bottom wall of the second hole, so that an inner portion of the battery cell communicates with an outer environment through the second hole, thereby releasing a pressure inside the battery cell; and removing the cover body and the sealing piece from the outer shell.

In some embodiments, the liquid injection method for the battery cell further includes:

Rotating the cover body from a first position to a second position, so the limiting portion of the cover body is staggered with a second accommodating portion on one side of the outer shell away from the inner portion of the battery cell in a peripheral direction of the first hole; and rotating the cover body from the second position to the first position, so that the limiting portion enters the second accommodating portion, thereby limiting the separation between the cover body and the sealing piece from the outer shell.

In some embodiments, the liquid injection method for the battery cell further includes:

rotating the cover body from a first position to a second position, so the limiting portion and a second accommodating portion are staggered in a circumferential direction of the first hole; and removing the cover body and the sealing piece which are kept in the connected state from the outer shell.

According to a seventh aspect of the present application, a liquid injection device is provided. The liquid injection device is applied to a battery cell and includes:

a liquid injection mechanism, configured to inject electrolyte into an outer shell through a first hole formed on the outer shell; and an assembly and disassembly mechanism, configured to take a sealing piece and a cover body which are kept in a connected state to the first hole before the first hole is sealed by the sealing piece, seal the first hole through the sealing piece when the sealing piece and the cover body are kept in the connected state, cover at least part of the sealing piece through the cover body, and drive the cover body to rotate relative to the sealing piece after the sealing piece is fitted with the first hole so as to realize relative fixation between the cover body and the outer shell.

According to the end cover assembly provided in the embodiment of the present application, through rotatable connection between the sealing piece and the cover body, during secondary liquid injection, the sealing piece and the cover body as a whole may be sealed together in the first hole or be separated from the first hole to close or open the first hole, so that secondary liquid injection is realized, the operation steps of the secondary liquid injection is simplified, the operation time is effectively shortened, and the operation efficiency is improved.

BRIEF DESCRIPTION OF THE DRAWINGS

The accompanying drawings described herein are used to provide further understanding of the present application and constitute a part of the present application. The schematic embodiments of the present application and the description thereof are used to explain the present application, but do not constitute an inappropriate limitation to the present application. In the accompanying drawings:

FIG. 1-A is an outline schematic diagram of some embodiments of a vehicle adopting a battery cell according to the present application;

FIG. 1-B is a structural schematic diagram of some embodiments of a battery according to the present application;

FIG. 1-C is a structural schematic diagram of some embodiments of a battery module according to the present application;

FIG. 1-D is an exploded view of some embodiments of a battery cell according to the present application;

FIG. 21A and FIG. 21B are respectively a top view and an A-A sectional view of some embodiments of a mounting part in the present application;

FIG. 22 is a schematic diagram of a partial structure of an end cover 1 in the present application;

DETAILED DESCRIPTION OF THE EMBODIMENTS

Figure 2:
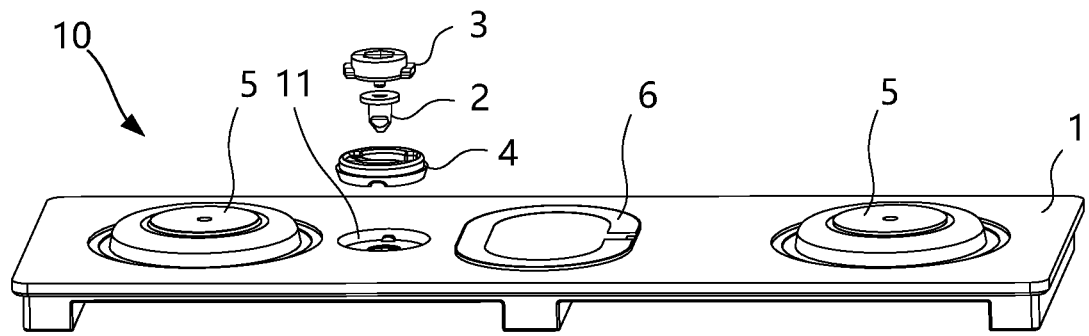
FIG. 2 is an exploded view of some embodiments of an end cover assembly according to the present application.

The present application is described hereinafter in detail. In the following paragraphs, different aspects of the embodiments are defined in detail. The aspects defined may be combined with one or more of any other aspects unless it is explicitly pointed that they cannot be combined. In particular, any features considered to be preferred or favorable may be combined with one or more of other features considered to be preferred or favorable combination.

The terms "first", "second" and the like appearing in the present application are only used to facilitate description so as to distinguish different components with the same name, but not to represent a sequence or a primary and secondary relationship.

In addition, when an element is called "on" another element, the element may be directly on another element, or may be indirectly on another element, and one or more intermediate elements may be inserted between the element and another element. In addition, when the element is called "connected to" another element, the element may be directly connected to another element, or may be indirectly connected to another element, and one or more intermediate elements may be inserted between the element and another element. Hereinafter, the same reference numerals represent the same element.

"A plurality of" in the present application refers to more than two. Similarly, "multiple groups" refers to more than two groups.

In order to clearly describe each azimuth in the following embodiments, for example, the coordinate system in FIG. 1-D defines each direction of a battery, wherein x direction represents a length direction of a battery cell 600; y direction is perpendicular to the x direction in a horizontal plane and represents a width direction of the battery cell 600; and z direction is perpendicular to a plane formed by the x and y directions and represents a height direction of the battery cell 600. Based on the azimuth definition, an azimuth or position relationship indicated by terms "upper", "lower", "top", "bottom", "front", "rear", "inner", "outer" and the like is described only for facilitating the description of the present application, but not for indicating or implying that the referred device must have a specific azimuth and perform construction and operation in the specific azimuth; therefore, it cannot be interpreted as a limitation to the protection scope of the present application.

There are many problems that bother the service life of the battery. For many years, those skilled in the art have tried to solve the problem from many different angles, but the expected effect has not been achieved.

As a part of the invention and creation process of the present application, the inventor found through analysis and research that one of the reasons for the service life of the battery is that the battery undergoes charging and discharging cycles for many times during use, the electrolyte in the battery will inevitably undergo irreversible reaction consumption, and the use capacity of the battery will decrease accordingly. Therefore, the inventor found that if the electrolyte in the battery can be supplemented in the use process of the battery, it will effectively slow down the reduction of the battery capacity and prolong the service life of the battery.

The lithium ion battery is mainly composed of four parts, namely a positive electrode material, a negative electrode material, electrolyte and a diaphragm, wherein the electrolyte is an ionic conductor which plays a conducting role between the positive and negative electrodes of the battery, and generally consists of two parts, namely electrolyte lithium salt and an organic solvent. In order to prevent electrolyte from infiltrating and polluting the ambient air and environment during use, or short circuit of the positive and negative electrodes caused by that water vapor or metal particles from enter the battery, the battery has high requirement on the sealing property of the structure. In related art known by the inventor, electrolyte pouring of the battery is generally performed in the production stage; and after electrolyte pouring, in order to ensure the sealing property of the battery, a liquid injection hole is closed generally by laser welding.

The battery is difficult to refill liquid in the use process. If liquid refill is required, it is also necessary to destruct a laser weld joint, which is difficult to be sealed again, further, the structure of the battery is irreversibly damaged, and the use performance of the battery is affected.

In view of this, the present application provides a battery cell with a detachable liquid injection component, which can conveniently realize secondary liquid injection of the battery. Through preserving the liquid injection hole, the process of injecting a needed amount of the electrolyte into the battery includes primary liquid injection and secondary liquid injection. The secondary liquid injection may also be known as supplementary liquid injection, further liquid injection and the like. The secondary liquid injection means the process of refilling or exchanging the electrolyte for the battery, or adding or refilling any solid, liquid or gas into the battery. By facilitating the secondary liquid injection, the present application can effectively delay the degradation of the capacity of a battery core and prolong the service life of the battery.

The electrolyte is subjected to electrochemical reaction in the battery during the use process of the battery, so it is necessary to ensure the sealing property of the battery and prevent leakage of the electrolyte. Therefore, in the end cover assembly embodiment provided by the present application, the end cover assembly includes a sealing piece for sealing a liquid injection hole, and a cover body for fixing the sealing piece. Through the sealing piece, the liquid injection hole can be effectively sealed; and through the cover body, the stability of the sealing piece can be ensured, and the sealing piece can be prevented from being separated from the liquid injection hole.

As a part of the inventing and creating process of the present application, the inventor also discovered that during secondary liquid injection, generally the liquid injection hole is firstly opened, then the electrolyte is injected into the battery through the liquid injection hole, and finally the liquid injection hole is sealed. Specifically, when opening the liquid injection hole, it is necessary to disassemble the cover body firstly and then disassemble the sealing piece; and when the liquid injection hole is sealed, it is necessary to mount the sealing piece first and then mount the cover body. That is to say, when the liquid injection hole is opened and sealed, the operation steps are relatively complex.

After discovering the problem that the operation steps are relatively complex when opening and closing the liquid injection hole, the inventor conducted careful analysis and research and found that one of the important reasons for the complex operation steps is that the sealing piece and the cover body are of a split-type structure. When assembling or disassembling the sealing piece and the cover body, it is necessary to assemble or disassemble them one by one. For the battery cell product, it has extremely high requirement on the sealing property. Therefore, the requirement on the positioning precision of the sealing piece and the cover body is high during assembling, the sealing piece and the cover body are assembled or disassembled one by one, will inevitably increase the disassembling and assembling difficulty, and the steps will be relatively complex.

Based on the above discovering, the present application provides an end cover assembly, a battery cell, a battery and a power consumption device, so that the sealing piece and the cover body are rotatably connected; during secondary liquid injection, the sealing piece and the cover body may seal or separate from the first hole as a whole, to close or open the first hole and realize secondary liquid injection; meanwhile, the operation steps of the secondary liquid injection are simplified, the operation time of secondary liquid injection is shortened, and the operation efficiency is improved; furthermore, the sealing effect can be effectively ensured, leakage of the electrolyte of the battery cell can be avoided, the performance of the battery cell can be improved, and the service life of the battery cell can be prolonged.

Based on the above thinking, the present application provides an end cover assembly, a shell assembly, a battery cell, a battery, a power consumption device, a liquid injection method and a liquid injection device.

The power consumption device includes a battery cell 600 for providing electric energy for the device. As shown in FIG. 1-A, the power consumption device may be a vehicle 100, for example, a new energy vehicle, wherein the new energy vehicle may be a battery electric vehicle, a hybrid electric vehicle or an extended-range vehicle; or the power consumption device may also be an unmanned aerial vehicle or a ship. The vehicle 100 includes a motor 200, a controller 300 and a battery 400, wherein the motor 200 is configured to drive the vehicle to move; the controller 300 may control the forward and backward of the vehicle and the vehicle speed of the vehicle; the battery 400 provides electric power for the vehicle and may be configured to drive the motor 200 to rotate; and the motor 200 drives wheels to rotate to achieve a driving effect on the vehicle 100.

The battery cell 600 capable of realizing secondary liquid injection may reduce the change frequency of the battery cell of the power consumption device, save cost, and improve the working reliability and power performance of the device. The device of the battery cell 600 provided by the present application may also simplify the operation steps of the secondary liquid injection, shorten the operation time and improve the efficiency of the secondary liquid injection.

In order to endow the battery a higher power to meet the use requirement, as shown in FIG. 1-B, the power consumption device may be provided with a battery 400. In some embodiments, the battery 400 may include a plurality of battery cells 600. The plurality of battery cells 600 may directly form the battery, or the plurality of battery cells 600 may also form a battery module 500 first and then the battery module 500 forms the battery. The battery 400 may include a first shell 401 and a second shell 402, wherein the first shell 401 and the second shell 402 are buckled with each other; and the plurality of battery cells 600 are arranged in a space surrounded by the first shell 401 and the second shell 402.

As shown in FIG. 1-C, the battery module 500 includes a plurality of battery cells 600, wherein the plurality of battery cells 600 may be connected in series, in parallel or in series-parallel to achieve higher capacity and power. For example, as shown in FIG. 1-C, the battery cell 600 may be vertically placed, a height of the battery cell 600 is consistent with the vertical direction, and the plurality of battery cells 600 are arranged side by side in a width direction; or the battery cell 600 may be horizontally placed, the width direction of the battery cell 600 is consistent with the vertical direction, the plurality of battery cells 600 may be stacked into at least one layer in the width direction, and each layer includes a plurality of battery cells 600 arranged at intervals in a length direction.

To make those skilled in the art understand the improvement points of the present application clearly, the overall structure of the battery cell 600 is described firstly.

As shown in FIG. 1-D, the battery cell 600 includes an end cover assembly 10, an adaptor 20, an electrode assembly 30 and a shell 40, wherein the electrode assembly 30 includes a tab 301, the adaptor 20 is connected to the electrode assembly 30, the electrode assembly 30 is arranged in the shell 40, and the shell 40 is filled with electrolyte. The top of the shell 40 is provided with an opening 401, and the end cover assembly 10 is configured to close the opening 401 to seal the adaptor 20 and the electrode assembly 30 inside the shell 40. The shell 40 may be square, cylindrical or of other shapes.

According to the actual use requirements, single or a plurality of electrode assemblies 30 may be provided. As shown in FIG. 1-D, at least two independently wound electrode assemblies 30 may be arranged in the battery. The electrode assembly 30 may form a main body portion by simultaneously winding or stacking a first pole piece, a second pole piece and a diaphragm located between the first pole piece and the second pole piece, wherein the diaphragm is an insulator between the first pole piece and the second pole piece. The main body portion is provided with two opposite end faces. In this embodiment, exemplarily, the first pole piece serves a positive pole piece and the second pole piece serves as a negative pole piece for description. A coating area of the positive pole piece is coated with a positive active substance, and a coating area of the negative pole piece is coated with a negative active substance. A plurality of uncoated areas extending from the coating area of the main body portion are stacked as a tab. The electrode assembly 30 includes two tabs 301, namely a positive tab and a negative tab. The positive tab extends from the coating area of the positive pole piece, and the negative tab extends from the coating area of the negative pole piece.

The end cover assembly 10 is arranged at the top of the electrode assembly 30. As shown in FIG. 1-D and FIG. 2, the end cover assembly 10 includes an end cover 1 and two electrode terminals 5, wherein the two electrode terminals 5 are respectively a positive terminal and a negative terminal; each electrode terminal 5 is correspondingly provided with an adaptor 20, the adaptor 20 is located between the end cover assembly 10 and the electrode assembly 30. A mounting hole is formed on the end cover 1 at a position corresponding to the electrode terminal 5, the electrode terminal 5 is fixed in the corresponded mounting hole, and a sealing ring may be arranged between the electrode terminal 5 and the mounting hole. For example, in FIG. 1-D, the tab 301 of the electrode assembly 30 is located at the top, the positive tab is connected to the positive terminal through one adaptor 20, and the negative tab is connected to the negative terminal through the other adaptor 20.

Optionally, in some other embodiments, the battery cell 600 may include two end cover assemblies 10 which are arranged at two ends of the shell 40 respectively, and each end cover assembly 10 is provided with one electrode terminal 5.

The end cover 1 may also be provided with an anti-explosion component 6. When there is excessive gas in the battery cell 600, the gas in the battery cell 600 is released timely to avoid explosion. The end cover 1 is provided with an exhaust hole, the exhaust hole may be formed at the middle position of the end cover 1 in a length direction, and the exhaust hole may be located between two mounting holes for mounting the electrode terminal 5. In a normal state, the anti-explosion component 6 is hermetically mounted at the exhaust hole. The battery cell 600 will generate gas during charging and discharging. When the gas pressure in the outer shell is increased to exceed a preset value, the anti-explosion component 6 will open, and the gas is released to the outside through the anti-explosion component 6. The anti-explosion component 6 may also be configured to blast when the temperature in the battery cell 600 is too high, achieving cooling and anti-explosion effects in a manner of releasing the gas in the battery cell.

In some embodiments, as shown in FIG. 2, the battery cell 600 is provided with a first hole 11 for injecting electrolyte into the battery cell 600, and the battery cell 600 further includes a liquid injection component for closing the first hole 11.

After the overall structure and the application of the battery cell 600 are described, the liquid injection component of the present application will be described in detail below. Firstly, that the liquid injection component is arranged on an end cover 1 is taken as an example for description. Based on this structure, a plurality of embodiments are given in the present application. The common points of the embodiments are given below.

Figure 25:
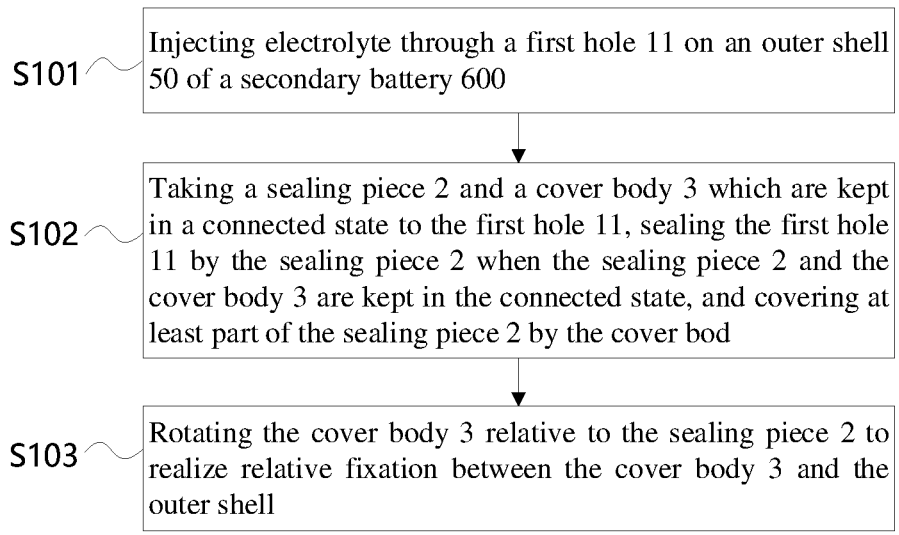
FIG. 25 is a flow schematic diagram of some embodiments of a liquid injection method for a battery cell according to the present application.

As shown in FIG. 1-D to FIG. 25, the present application provides an end cover assembly 10, applied to the battery cell 600. In some embodiments, the end cover assembly 10 includes an end cover 1, a sealing piece 2 and a cover body 3.

As shown in FIG. 2, the end cover 1 is provided with a first hole 11 for injecting electrolyte, and the first hole 11 may be adopted as a round hole, an elliptical hole, a polygonal hole or holes of other shapes. The first hole 11 may be arranged in a height direction of the battery cell 600, that is, the first hole may be arranged in a height direction of the end cover 1, or may be arranged obliquely relative to the height direction of the end cover 1. The first hole 11 may be arranged between a mounting hole for mounting an electrode terminal 5 and an exhaust hole for mounting an anti-explosion component 6.

The sealing piece 2 is configured to seal the first hole 11. The sealing piece 2 may be sealed at the periphery of the first hole 11, or may also be inserted into the first hole 11, so as to effectively seal the first hole 11 and prevent the electrolyte in the battery cell 600 from leaking through the first hole 11.

The cover body 3 is configured to cover at least part of the sealing piece 2 to prevent separation between the sealing piece 2 and the end cover 1. The cover body 3 may press the sealing piece 2 to deform the sealing piece 2 and improve the sealing effect, or only contact the sealing piece 2 to limit its degree of freedom in a height direction; and in a case that the sealing piece 2 tightly fits the first hole 11 and can independently enclose the first hole 11, the cover body 3 and the sealing piece may be arranged at intervals in the height direction. The cover body 3 may completely cover the sealing piece 2 so as to apply pressure to the sealing piece 2, limit position or prevent external impurities from entering the battery cell 600; and in a case that the sealing piece 2 tightly fits the first hole 11 and can independently enclose the first hole 11, the cover body 3 may also partially cover the sealing piece 2.

The cover body 3 is rotatable relative to the end cover 1, and the cover body 3 is detachably connected to the end cover 1 through rotation. For example, the cover body 3 is rotatable in a plane perpendicular to the height direction, and a rotation axis may be an axis of the first hole 11.

According to the present application, separation between the cover body 3 and the end cover 1 may be realized by rotating the cover body 3 to realize secondary liquid injection. By facilitating the secondary liquid injection, the present application may effectively slow down the degradation of the capacity of the battery cell 600 and prolong the service life of the battery.

Further, the liquid injection component is detachable. After the liquid injection component is disassembled, the first hole 11 communicates the inner portion of the shell 40 with the external atmosphere, so that gas in the shell 40 or bubbles between the pole pieces can be discharged. By discharging the bubbles between the pole pieces and shortening the gap between the pole pieces, the cycle performance of the battery cell 600 can be improved, and the service life of the battery 600 can be further prolonged. By discharging the bubbles in the battery cell 600, the present application may also release the pressure in the shell 40, so as to reduce the gas continuously applying stress onto the anti-explosion component 6 inside the shell 40, and reduce the risk of leakage of the battery cell 600 caused by creep rupture of the anti-explosion component 6 or the risk of shortening the life caused by the entry of water vapor, thereby further prolonging the service life of the battery core; meanwhile, the action force applied to other structures by the expansion of the battery cell 600 caused by the large gas inside the battery cell 600 can be reduced, and damage to other structures caused by excessive expansion force of the battery cell 600 is avoided, so that the service life of the battery is prolonged.

According to the present application, through a rotation of the cover body 3 the combination and separation between the cover body 3 and the end cover 1 can be realized, further the opening and closing of the first hole 11 can be realized, enables a detachable structure formed between the cover body 3 and the end cover 1, which ensures that the liquid injection structure will not be damaged when opening the cover body 3, and also the first hole 11 may be reliably closed after secondary liquid injection, so that the working reliability of the battery cell after secondary liquid injection can be ensured. Therefore, the appearance of the battery cell 600 is kept consistent before and after the liquid injection, thereby not affecting the use after the secondary liquid injection. Further, the first hole 11 is enclosed directly through the rotation of the cover body 3, so it is unnecessary to seal the first hole 11 through laser welding, thereby reducing the step of cleaning the first hole 11 before laser welding and improving the production efficiency of the battery.

Figure 3:
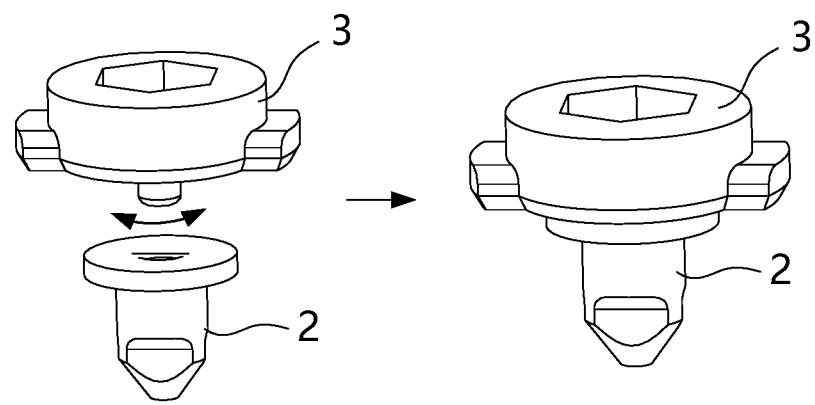
FIG. 3 is an assembling schematic diagram of some embodiments of a sealing piece and a cover body in an end cover assembly according to the present application.

As shown in FIG. 3, one of the sealing piece 2 and the cover body 3 is provided with a second hole 21 and the other one of the sealing piece 2 and the cover body 3 is provided with a boss 31, the boss 31 is configured to be inserted into a second hole 21, and the boss 31 and the second hole 21 are relatively rotatable, so that the sealing piece 2 and the cover body 3 are rotatably connected.

Specifically, in some embodiments, the sealing piece 2 is provided with the second hole 21, the cover body 3 is provided with the boss 31, and the boss 31 is inserted into the second hole 21, so that the sealing piece 2 and the cover body 3 are rotatably connected. In some other embodiments, the sealing piece 2 is provided with the boss 31, the cover body 3 is provided with the second hole 21, and the boss 31 is inserted into the second hole 21, so that the sealing piece 2 and the cover body 3 are rotatably connected.

Through disposing the sealing piece 2 and the cover body 3 being connected with each other, when opening or closing the first hole 11, the sealing piece 2 and the cover body 3 are mounted or disassembled as a whole, so that operation steps are simplified, operation time is shortened, and operation efficiency is improved. After the sealing piece 2 and the cover body 3 are mounted, impurities may be prevented from entering the battery cell 600 through the first hole 11.

Further, the cover body 3 is rotatable relative to the end cover 1. The sealing piece 2 and the cover body 3 are rotatably connected, so when the cover body 3 is rotated, the cover body 3 can be prevented from driving the sealing piece 2 to act cooperatively, relative fixation between the sealing piece 2 and the end cover 1 is maintained, and the reduction of the sealing effect caused by abrasion due to the relative rotation between the sealing piece 2 and the end cover 1 is avoided.

The fitted structure of the sealing piece 2 and the cover body 3 in the present application is described below in detail with reference to FIG. 4 to FIG. 19B.

As shown in FIG. 4 to FIG. 11, in some embodiments, the boss 31 is connected to the second hole 21 through an interference fit.

Due to the interference fit between the boss 31 and the second hole 21, the sealing piece 2 and the cover body 3 can be connected, and the sealing piece 2 and the cover body 3 also can relatively rotate. Rotatable connection between the sealing piece 2 and the cover body 3 is realized through an interference fit manner, so that it is unnecessary to introduce new parts and new structures, and the manufacturing cost is reduced.

The boss 31 and the second hole 21 are in interference fit, that is, the boss 31 and the second hole 21 are in tight fit. There is a magnitude of interference between the dimensions of the boss 31 and the second hole 21, and the tolerance zone of the second hole 21 is below the tolerance zone of the boss 31.

In some embodiments, the boss 31 is a rotating body. The boss 31 is rotatable relative to the sealing piece 2 in the second hole 21. The boss 31 is set to be a rotating body, so that the sealing piece 2 and the cover body 3 are rotatably connected. A shape of the second hole 21 is matched with a shape of the boss 31.

The boss 31 is a rotating body, specifically, it may be a cylinder, a sphere or a part of a sphere.

Figure 12:
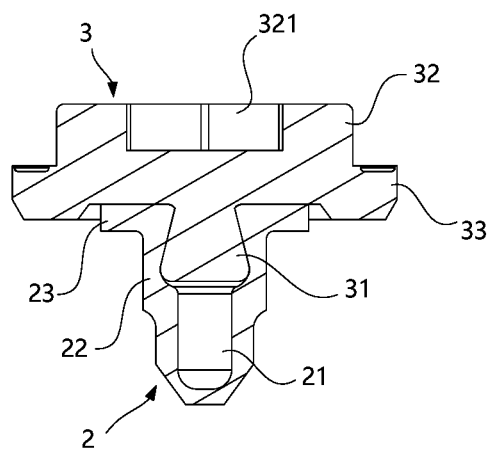
FIG. 12 is a sectional view of a fitted structure of a cover body and a sealing piece in a third embodiment.
Figure 13:
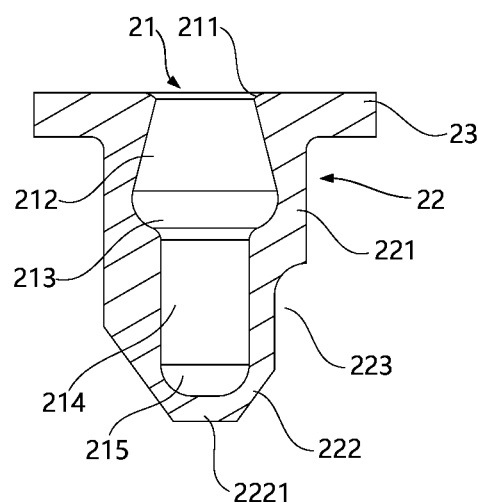
FIG. 13 is a sectional view of some embodiments of a cover body in a third embodiment.
Figure 14:
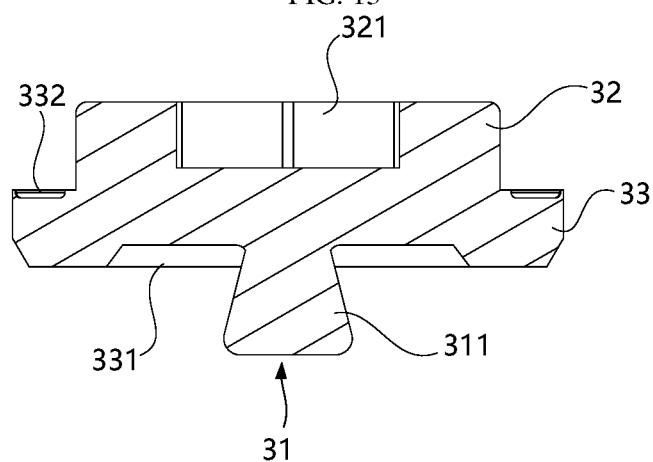
FIG. 14 is a sectional view of some embodiments of a sealing piece in a third embodiment.

A shape of the boss 31 is matched with a shape of the second hole 21 so as to realize the interference fit. For example, as shown in FIG. 4 to FIG. 11, the shape of the boss 31 is a cylinder, and the shape of the second hole 21 is a cylinder matched with the boss 31. Or as shown in FIG. 12 to FIG. 14, the shape of the boss 31 is a circular truncated cone, and the shape of the second hole 21 is a circular-shaped truncated cone matched with the boss 31. Or as shown in FIG. 15 to FIG. 18, the shape of the boss 31 is a stepped cylinder, and the shape of the second hole 21 is a stepped cylinder matched with the boss 31. Multiple different embodiments of the boss 31 and the second hole 21 will be introduced in detail below.

As shown in FIG. 12 to FIG. 18, in some embodiments, the boss 31 includes a first inserting portion 311, a first accommodating portion 212 is arranged on a hole wall of the second hole 21, and the first inserting portion 311 is accommodated in the first accommodating portion 212, thereby limiting separation between the sealing piece 2 and the cover body 3.

Through the first inserting portion 311 and the first accommodating portion 212, the first inserting portion 311 is inserted into the first accommodating portion 212. Through fit between the first inserting portion 311 and the first accommodating portion 212, separation between the sealing piece 2 and the cover body 3 can be limited, and stable connection between the sealing piece 2 and the cover body 3 can be ensured.

The boss 31 may only include a first inserting portion 311, and may further include other parts in addition to the first inserting portion 311. The second hole 21 may only include a first accommodating portion 212, and may also include other parts in addition to the first accommodating portion 212.

The shapes of the first inserting portion 311 and the first accommodating portion 212 are matched, and separation between the sealing piece 2 and the cover body 3 can be limited through fit between the first inserting portion 311 and the first accommodating portion 212. Since the battery cell 600 may vibrate during use, maintaining the connection stability of the sealing piece 2 and the cover body 3 is beneficial for the battery cell 600 to resist the vibration and decrease the loosening problem, so that the service life of the battery cell 600 can be prolonged.

As shown in FIG. 12 to FIG. 14, in some embodiments, in a direction perpendicular to an axis of the second hole 21, the cross-sectional area of the first accommodating portion 212 gradually increases in a direction away from an inserted end of the second hole 21, and the first inserting portion 311 is fitted with the first accommodating portion 212 to limit separation between the sealing piece 2 and the cover body 3.

The cross-sectional area of the first accommodating portion 212 gradually increases in a direction away from the inserted end of the second hole 21, and the difficulty of the first inserting portion 311 being separated from the first accommodating portion 212 can be increased, so that separation between the sealing piece 2 and the cover body 3 can be limited. In a direction parallel with the axis of the second hole 21, the section of the first accommodating portion 212 is trapezoidal.

As shown in FIG. 15 to FIG. 18, the boss 31 includes a first inserting portion 311 and a second insertion portion 312, and both the first inserting portion 311 and the second insertion portion 312 are cylindrical. The second hole 21 includes a third extension portion 216 and a first accommodating portion 212, the third extension portion 216 is fitted with the second insertion portion 312, and the first accommodating portion 212 is fitted with the first inserting portion 311. A diameter of the first inserting portion 311 is greater than a diameter of the second insertion portion 312, and a diameter of the first accommodating portion 212 is greater than a diameter of the third extension portion 216, so the fit between the first inserting portion 311 and the first accommodating portion 212 may limit the separation between the sealing piece 2 and the cover body 3.

As shown in FIG. 4 to FIG. 18, in some embodiments, the second hole 21 is a blind hole, that is, one end of the second hole 21 away from the cover body 3 is closed. This structure can effectively prevent impurities from entering the battery cell 600 through the second hole 21, and can also effectively prevent the electrolyte in the battery cell 600 from leaking through the second hole 21.

In some embodiments, the sealing piece 2 and the end cover 1 are relatively fixed in a peripheral direction of the first hole 11.

The sealing piece 2 and the end cover 1 are kept relatively fixed in the circumferential direction, so that rotation of the sealing piece 2 relative to the end cover 1 along with the cover body 3 when the cover body 3 rotates relative to the end cover 1 can be avoided, abrasion between the sealing piece 2 and the end cover 1 can be reduced, and the influence on the sealing effect can be reduced.

In the battery cell 600 provided by the present application, the sealing piece 2 seals at the first hole 11 and abuts against a lower side of the end cover 1. In the actual using process, when rotating the cover body 3 relatively to the end cover 1, if the cover body 3 covers most part of the sealing piece 2 or completely covers the sealing piece 2, it may be impossible to directly inspect whether the sealing piece 2 located below the cover body 3 rotates relative to the end cover 1. In order to solve the problem, an outer surface of the sealing piece 2 and a hole wall of the first hole 11 may be marked respectively. Before rotating the cover body 3, the marker of the sealing piece 2 and the first hole 11 at the fitted position are recorded. Then after the cover body 3 is rotated, open the cover body 3 is opened again, check the positions of the markers to judge whether the relative position between the sealing piece 2 and the first hole 11 has changed. The marker may be in the form of marking out, labeling and the like.

In some embodiments, a rotation axis of the cover body 3 relative to the sealing piece 2 is collinear with an axis of the first hole 11.

If the rotation axis of the cover body 3 relative to the sealing piece 2 is not collinear with the axis of the first hole 11, when the cover body 3 rotates relative to the sealing piece 2, the cover body 3 will drive the sealing piece 2 to rotate due to eccentricity, causing friction between the sealing piece 2 and the end cover 1, so through disposing the rotation axis of the cover body 3 relative to the sealing piece 2 to be collinear with the axis of the first hole 11, it is effectively ensured that the sealing piece 2 does not rotate with the cover body 3 when the cover body 3 rotates relative to the end cover 1, thereby reducing friction between the sealing piece 2 and the end cover 1.

In some embodiments, the sealing piece 2 includes a sealing column 22 inserted into the first hole 11. The sealing piece 2 effectively seals the first hole 11 through the sealing column 22 so as to prevent electrolyte from leaking and impurities from entering.

The sealing column 22 is inserted into the first hole 11, so that a good sealing effect on the first hole 11 can be achieved.

In some embodiments, the sealing column 22 is a non-rotating body, and a shape of the first hole 11 is matched with the sealing piece 2.

The sealing column 22 is set to be a non-rotating body, thereby effectively ensures relative fixation between the sealing piece 2 and the end cover 1 and preventing abrasion caused by relative rotation between the sealing piece 2 and the end cover 1. The shape of the first hole 11 is matched with the sealing piece 2, which is beneficial for the sealing of the first hole 11.

Figure 19A:
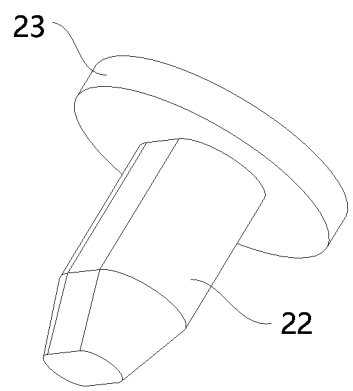
FIG. 19A and FIG. 19B are respectively a structural schematic diagram and a bottom view of a sealing piece in a fifth embodiment.
Figure 19B:
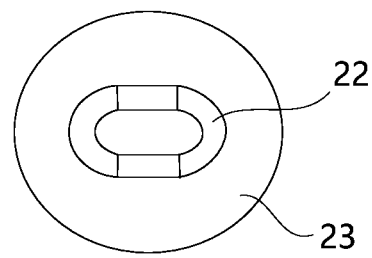

As shown in FIG. 19A and FIG. 19B, a cross-sectional shape of the sealing column 22 is elliptic, the shape of the first hole 11 is set to be matched with the sealing piece 2, and the sealing column 22 cannot rotate in the first hole 11 after being matched with the first hole 11, so that the sealing piece 2 and the end cover 1 are relatively fixed.

In addition to an ellipse, in some other embodiments, the cross-sectional shape of the sealing column 22 may also be of a polygon or irregular shape.

in some embodiments, the sealing column 22 is in interference fit with the first hole 11. The sealing column 22 is in interference fit with the first hole 11, that is, the sealing column 22 is in tight fit with the first hole 11. There is a magnitude of interference between the dimensions of the sealing column 22 and the first hole 11, and the tolerance zone of the first hole 11 is below the tolerance zone of the sealing column 22.

The fit between the sealing column 22 and the first hole 11 is set to be interference fit, so that the difficulty of rotating the sealing column 22 in the first hole 11 can be increased, and the sealing piece 2 and the end cover 1 are relatively fixed.

In some embodiments, the sealing column 22 and the first hole 11 are in interference fit, the boss 31 and the second hole 21 are in interference fit, and a friction force between the sealing column 22 and the first hole 11 is greater than a friction force between the boss 31 and the second hole 21. After such arrangement, when the external force applied to the cover body 3 can make the cover body 3 rotate relative to the sealing piece 2, the external force is not enough to overcome the friction force between the sealing piece 2 and the end cover 1 to cause relative rotation between the sealing piece 2 and the end cover 1, so relative fixation between the sealing piece 2 and the end cover 1 can be ensured, and abrasion between the sealing piece 2 and the end cover 1 is reduced.

In some embodiments, the sealing column 22 and the first hole 11 are in interference fit, the boss 31 and the second hole 21 are in interference fit, and a friction coefficient of a contact surface between the sealing column 22 and the first hole 11 is greater than a friction coefficient of a contact surface between the boss 31 and the second hole 21.

When the sealing column 22 and the first hole 11, and the boss 31 and the second hole 21 are in interference fit, the friction coefficient of the contact surface between the sealing column 22 and the first hole 11 is set to be greater than the friction coefficient of the contact surface between the boss 31 and the second hole 21. When an external force applied to the cover body 3 can make the cover body 3 rotate relative to the sealing piece 2, due to the different coefficients, the external force on the sealing piece 2 during rotation of the cover body 3 is not enough to drive the sealing piece 2 rotate relative to the end cover 1, so relative fixation between the sealing piece 2 and the end cover 1 can be ensured, and abrasion between the sealing piece 2 and the end cover 1 is reduced.

In some other embodiments, the sealing column 22 and the first hole 11 are in interference fit, the boss 31 and the second hole 21 are in interference fit, and the magnitude of interference between the sealing column 22 and the first hole 11 is greater than the magnitude of interference between the boss 31 and the second hole 21.

The larger magnitude of interference between the sealing column 22 and the first hole 11 may make the friction force between the sealing column 22 and the first hole 11 become larger, so that the relative rotation between the sealing piece 2 and the end cover 1 requires a larger external force than that can drive the cover body 3 to rotate relative to the sealing piece 2. Therefore, when the cover body 3 rotates relative to the sealing piece 2, the sealing piece 2 and the end cover 1 can be relatively fixed.

On the premise of ensuring that the friction force between the sealing column 22 and the first hole 11 is greater than the friction force between the boss 31 and the second hole 21, in some embodiments where the magnitude of interference between the sealing column 22 and the first hole 11 is greater than the magnitude of interference between the boss 31 and the second hole 21, the friction coefficient of the contact surface between the sealing column 22 and the first hole 11 may be equal to or greater than the friction coefficient of the contact surface between the boss 31 and the second hole 21.

On the premise of ensuring that the friction force between the sealing column 22 and the first hole 11 is greater than the friction force between the boss 31 and the second hole 21, in some embodiments where the friction coefficient of the contact surface between the sealing column 22 and the first hole 11 is greater than the friction coefficient of the contact surface between the boss 31 and the second hole 21, the magnitude of interference between the sealing column 22 and the first hole 11 may be equal to or greater than the magnitude of interference between the boss 31 and the second hole 21.

In some other embodiments, the sealing column 22 and the first hole 11 are in interference fit, the boss 31 and the second hole 21 are in interference fit, the friction coefficient of the contact surface between the sealing column 22 and the first hole 11 is greater than the friction coefficient of the contact surface between the boss 31 and the second hole 21, and the magnitude of interference between the sealing column 22 and the first hole 11 is greater than the magnitude of interference between the boss 31 and the second hole 21. This structure can more effectively keep the sealing piece 2 and the end cover 1 relatively fixed during rotation of the cover body 3 relative to the sealing piece 2.

In some embodiments, the sealing piece 2 further includes an anti-thrust platform 23 connected to the sealing column 22, the anti-thrust platform 23 is located between the cover body 3 and the end cover 1, and the anti-thrust platform 23 is fitted with an end face of the first hole 11.

The anti-thrust platform 23 has a preset thickness and may be sealed on an outer end face of the first hole 11. In a direction perpendicular to the axis of the first hole 11, the sectional area of the anti-thrust platform 23 is greater than or equal to the sectional area of the first hole 11. The arrangement of the anti-thrust platform 23 may effectively seal an outer end of the first hole 11, may prevent electrolyte from flowing out of a gap between the sealing column 22 and the first hole 11, and may also prevent impurities from entering the battery cell 600 through the gap between the sealing column 22 and the first hole 11.

In some embodiments, a fitted surface between the anti-thrust platform 23 and the end face of the first hole 11 is a flat plane. This structure is beneficial to formation of a tight contact between the anti-thrust platform 23 and the end face of the first hole 11, effectively seal the anti-thrust platform 23 and the end face of the first hole 11, and prevent electrolyte from leaking or impurities from entering.

The fitted structure of the cover body 3 and the end cover 1 in the present application is described below.

Figure 4:
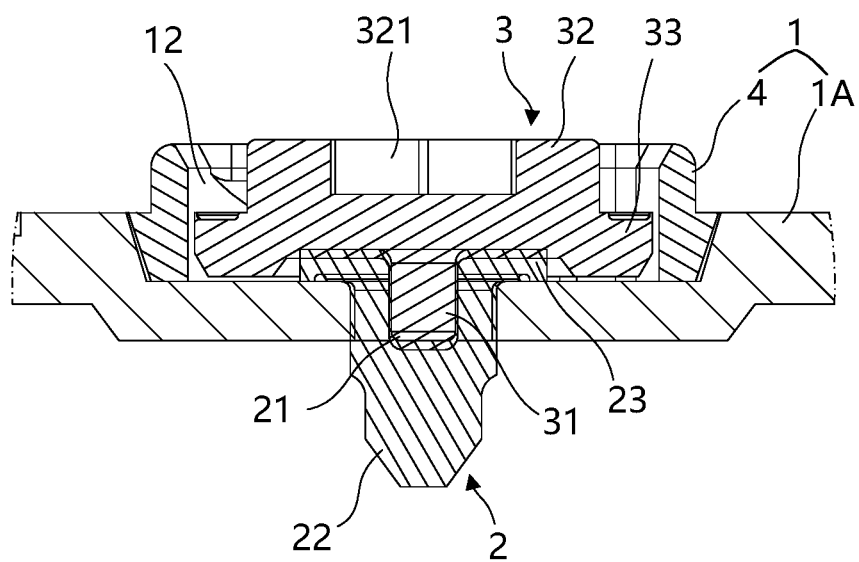
FIG. 4 is a sectional view of some embodiments of an end cover assembly according to the present application.

As shown in FIG. 4, in some embodiments, the end cover 1 is provided with a second accommodating portion 12 arranged in a peripheral direction of the first hole 11, the second accommodating portion 12 is configured to accommodate at least part of the cover body 3 to limit the cover body 3, and the second accommodating portion 12 is located on one side of the end cover 1 away from the inner portion of the battery cell 600.

The second accommodating portion 12 may accommodate one part of the cover body 3 to limit the cover body 3, thereby limiting a degree of freedom of the cover body 3 in its height direction, preventing separation between the cover body 3 and the end cover 1, and realizing relative fixation between the cover body 3 and the end cover 1. Meanwhile, the cover body 3 may also at least partially cover the sealing piece 2, so after the degree of freedom of the cover body 3 in the height direction is limited by the end cover 1, the sealing piece 2 is pressed under the cover body 3, and the sealing piece 2 is also fixed.

The second accommodating portion 12 is located on one side of the end cover 1 away from the shell 40 and is arranged in the peripheral direction of the first hole 11, and the second accommodating portion 12 may be a cavity extending in a partial peripheral direction of the first hole 11. There is a preset distance between the second accommodating portion 12 and a surface of the end cover 1 close to the shell 40, and the size of the preset distance is not limited. For example, the second accommodating portion 12 may be arranged on an upper area, a medium area or a lower area of the end cover 1, so that at least part of the end cover 1 is located between the second accommodating portion 12 and the electrode assembly 30, instead of directly arranging the second accommodating portion 12 on a bottom surface of the end cover 1.

As shown in FIG. 4 to FIG. 18, in some embodiments, the cover body 3 is rotatable relative to the end cover 1 and includes a limiting portion 33. When the cover body 3 rotates to a first position, the limiting portion 33 is located in the second accommodating portion 12 to limit separation between the cover body 3 and the end cover 1; and when the cover body 3 rotates to a second position, the limiting portion 33 and the second accommodating portion 12 are staggered in the peripheral direction of the first hole 11, so as to realize separation between the cover body 3 and the end cover 1.

The limiting portion 33 is set to be fitted with the second accommodating portion 12, so that the end cover 1 and the cover body 3 are detachably connected. The cover body 3 includes a cover body main portion 32 for covering at least part of the sealing piece 2, for example, the cover body main portion 32 may be of a disk-shaped or ring-shaped structure. The limiting portion 33 is arranged on a peripheral side surface of the cover body main portion 32 and extends outwards in a radial direction. The number of the limiting portion 33 is matched with the number of the second accommodating portion 12. In the embodiments shown in FIG. 4 to FIG. 18, two limiting portion 33 are arranged with intervals on a side surface of the cover body main portion 32, two second accommodating portions 12 are arranged on the end cover 1, and the two limiting portion 33 and the two second accommodating portions 12 are arranged in one-to-one correspondence. In other embodiments, the number of the second accommodating portions 12 and the limiting portions 33 may be more than two, such as three, four and the like.

Through a plurality of limiting portions 33, the cover body 3 has a plurality of limiting supports at the first position, may be stably clamped by the second accommodating portions 12, and reduces the clamping force subjected by the limiting portions 33, so that the strength of the limiting portions 33 is ensured. For example, the plurality of limiting portions 33 may be arranged uniformly in a peripheral direction of the cover body main portion 32, so that the stress distribution of the cover body 3 in the overall peripheral direction is more balanced, inclination of the cover body 3 is avoided, and the cover body 3 can be rotated from the first position to the second position smoothly during secondary liquid injection. For the structure in which the cover body 3 presses the sealing piece 2, the limiting portion 33 can be prevented from scratching the sealing piece 2 during rotation.

A clamping structure is formed between the limiting portion 33 and the second accommodating portion 12. When the cover body 3 rotates to the first position, the limiting portion 33 is partially or totally located in the second accommodating portion 12 to limit separation between the cover body 3 and the end cover 1 so as to close the first hole 11; and when the cover body 3 rotates to the second position in a clockwise direction or an anti-clockwise direction, the limiting portion 33 and the second accommodating portion 12 are staggered in the peripheral direction of the first hole 11, and the limiting portion 33 is completely separated from the second accommodating portion 12, so that the cover body 3 and the end cover 1 are separated, and electrolyte can be injected in this state.

The cover body 3 is limited or separated from the second accommodating portion 12 through rotation. In the rotating process, friction may occur between the limiting portion 33 and an inner wall of the second accommodating portion 12, resulting in generation of metal particles. Since the second accommodating portion 12 in the present application is located on one side of the end cover 1 away from the shell 40, the metal particles generated in the rotating process will not directly fall into the shell 40 to cause the shortcircuit of the battery cell 600, so that the safety of the battery cell 600 is further improved.

An extending length of the limiting portion 33 in the circumferential direction of the first hole 11 and an extending width in a radial direction of the first hole 11 ensure the strength of the clamping structure, so damage to the clamping structure can be avoided in case of a large number of disassembling and assembling times. Furthermore, when the battery cell 600 is applied to a vehicle 100, since the vehicle 100 will vibrate in the working process, the present application can prevent the limiting portion 33 and the second accommodating portion 12 from being damaged by long-time vibration by improving the clamping strength of the limiting portion 33 and the second accommodating portion 12, thereby ensuring the working reliability and the service life of the battery cell 600.

The limiting portion 33 and the second accommodating portion 12 are fitted or separated through rotation of the cover body 3, so the present application has the advantages of simple structure, high requirement on fitting precision and reusability; in the aspect of processing, the limiting portion 33 is arranged on the cover body 3 and the second accommodating portion 12 is arranged on the end cover 1, which are easy to process and suitable for a lithium ion battery with a small overall size; and in the aspect of assembling and maintenance, the cover body 3 is easy to disassemble and assemble, so the assembling efficiency of the battery can be improved during production, and the maintenance time can be shortened during secondary liquid injection.

In some embodiments, the boss 31 and the second hole 21 are configured to be relatively rotatable in the process that the cover body 3 rotates from the first position to the second position.

The boss 31 and the second hole 21 may be set to be partially rotatable in a peripheral direction of rotation, for example, a limiting boss may be arranged in the second hole 21 to limit the peripheral rotation of the boss 31; and the boss 31 and the second hole 21 may be set to be relatively rotatable in a whole peripheral in the circumferential direction of rotation if the boss 31 and the second hole 21 are set to be partially relatively rotatable in the peripheral direction, the rotation range can be effectively limited, the boss 31 and the second hole 21 can rotate in a preset rotation range, and it is beneficial for controlling the limit positions of rotation. If the boss 31 and the second hole 21 are set to be relatively rotatable in the whole periphery, the rotation flexibility can be improved, and operation is facilitated.

In some embodiments, the end cover 1 further includes a guide portion 13 communicating with the second accommodating portion 12; and the limiting portion 33 is configured to enter the second accommodating portion 12 through the guide portion 13, or be separated from the end cover 1 through the guide portion 13. Through disposing the guide portion, the limiting portion 33 may enter the second accommodating portion 12 or be separated from the end cover 1 more smoothly, so that the operation convenience and the operation efficiency are improved.

The guide portion 13 forms a path through which the second accommodating portion 12 communicates with the outside of the end cover 1. For example, a plurality of second accommodating portions 12 are arranged in a peripheral direction, the guide portion 13 is an opening area formed between the adjacent second accommodating portions 12, and when the cover body 3 is located at the second position, the limiting portion 33 and the second accommodating portions 12 are staggered peripherally and are located in the guide portion 13. Or only one second accommodating portion 12 is arranged in the peripheral direction, and the guide portion 13 is an opening area in the peripheral direction except for the second accommodating portion 12.

A peripheral length of the guide portion 13 may be greater than a peripheral length of the limiting portion 33 and does not exceed a peripheral length of the second accommodating portion 12 so as to increase the clamping length of the limiting portion 33 and the second accommodating portion 12 as much as possible and improve the limiting stability; moreover, the peripheral length of the guide portion 13 is such that the limiting portion 33 can smoothly enter the guide portion 13.

In some embodiments, the end cover 1 is provided with a first groove 14, the first groove 14 communicates with the first hole 11, the opening area of the first groove 14 is greater than the opening area of the first hole 11, the first groove 14 is configured to accommodate the cover body 3, the first groove 14 communicates with the guide portion 13, and by placing the cover body 3 in the first groove 14 and rotating the cover body 3 can make the cover body 3 enter the second accommodating portion 12 through the guide portion 13.

In some embodiments, the end cover 1 includes an end cover body 1A and a mounting part 4; the mounting part 4 is arranged on a surface of the end cover body 1A and is arranged around the first hole 11; and the second accommodating portion 12 is arranged on the mounting part 4 or the second accommodating portion 12 is surrounded by the mounting part 4 and the end cover body 1A. The mounting part 4 is mounted in the first groove 14.

Since the end cover 1 has a thin plate-shaped structure and is difficult to process a complex structure, the second accommodating portion 12 can be easily formed by arranging the mounting part 4, so that the processing difficulty of the end cover 1 can be reduced.

The specific structure of the mounting part 4 in the present application is described below in with reference to FIG. 20A to FIG. 21B.

Figure 20A:
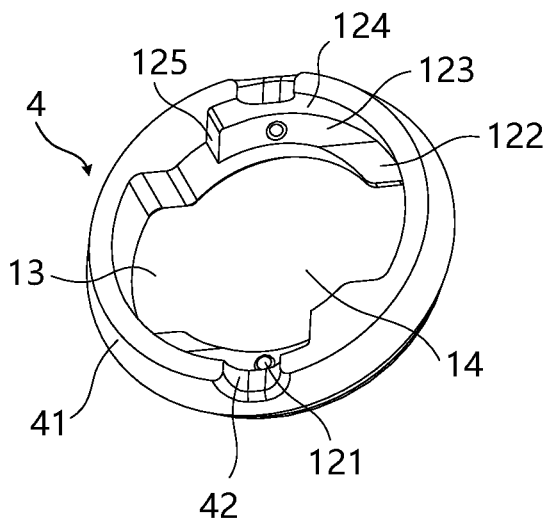
FIG. 20A and FIG. 20B are respectively schematic diagrams of front and back structures of some embodiments of a mounting part in the present application.
Figure 20B:
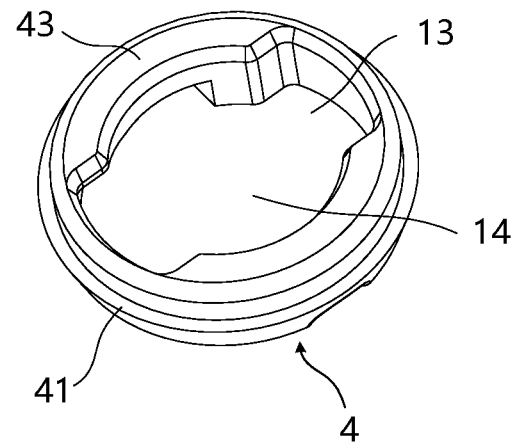

As shown in FIG. 20A, it is a front structure of a mounting part 4 in some embodiments; as shown in FIG. 20B, it is a back structure of a mounting part 4 in some embodiments; as shown in FIG. 21A, it is a top view of a mounting part 4 in some embodiments; and as shown in FIG. 21B, it is an A-A section view of a mounting part 4 in some embodiments.

The second accommodating portion 12 is arranged on the mounting part 4. The mounting part 4 includes a mounting ring 41 and a limiting platform 43, the limiting platform 43 is connected to an inner wall of the mounting ring 41 and extends inwards in a radial direction, the mounting ring 41 is fixed on the end cover body 1A, and a second accommodating portion 12 is formed between the limiting platform 43 and the end cover body 1A. The mounting ring 41 may be of a ring-shaped structure, and the first groove 14 is arranged at the center of the mounting ring 41.

The second accommodating portion 12 includes a limiting wall 123 and a side wall 124 connected to the limiting wall 123, and a bottom surface of the limiting platform 43 serves as the limiting wall 123. When the cover body 3 rotates to the first position, the limiting wall 123 abuts against the limiting portion 33, and the limiting wall 123 is a top wall and may limit the degree of freedom of upward motion of the cover body 3 in a height direction so as to limit separation between the cover body 3 and the end cover 1.

The limiting wall 123 is provided with an inclined surface 122, and the inclined surface 122 is configured to gradually decrease its distance from the cover body 3 along a direction of which the cover body 3 rotates from the second position to the first position. The inclined surface 122 may be arranged at one end or two ends of the second accommodating portion 12 in the peripheral direction, so that the limiting portion 33 can enter the second accommodating portion 12 smoothly. For example, the inclined surface 122 may be a flat surface or a cambered surface.

Through the inclined surface 122, the limiting portion 33 may enter the second accommodating portion 12 smoothly without alignment adjustment, so that the assembling efficiency can be improved, and the limiting portion 33 can be prevented from colliding with an entrance of the second accommodating portion 12, thereby prolonging the service life of the liquid injection component and reducing metal scraps.

A blocking portion 125 is arranged in the second accommodating portion 12 and is configured to limit a maximum rotation distance of the limiting portion 33. Each second accommodating portion 12 may be provided with one blocking portion 125. The blocking portion 125 may block rotation of the limiting portion 33 so as to prevent the limiting portion 33 from being directly rotated out of the second accommodating portion 12.

The side surface of the limiting portion 33 in the peripheral direction is completely attached to the blocking portion 125 in the state of reaching the maximum rotation distance. For example, the cover body main portion 32 is uniformly provided with two limiting portions 33 in the peripheral direction, and two side surfaces of the limiting portions 33 in the peripheral direction are both parallel with the center plane of the cover body 3. Correspondingly, the blocking portions 125 of two second accommodating portions 12 are centrosymmetric with respect to the center plane of the second hole 21, and the two blocking portions 125 are parallel with each other. Optionally, the side surface of the limiting portion 33 in the peripheral direction may partially abut against the blocking portion 125.

In order to prevent the mounting part 4 from circumferentially rotating relative to the first groove 14 during mounting, as shown in FIG. 20A to FIG. 21B, a second groove 42 may be formed at the bottom of the mounting part 4, for example, the second groove 42 may be formed at the bottom of the mounting ring 41. Correspondingly, as shown in FIG. 22, a clamping portion 141 is arranged at the connection position of the bottom wall and the side wall of the first groove 14, and the clamping portion 141 is fitted with the second groove 42 to limit the mounting part 4 from peripherally rotating relative to the first groove 14.

In some embodiments, the sealing piece 2 may be deformed, and a high-elasticity material resistant to electrolyte, such as rubber or other elastic plastic, is selected.

When it is necessary to mount the cover body 3, apply a downward force upon the cover body 3, through the deformation of the sealing piece 2 to generate a gap between the limiting portion 33 and the second accommodating portion 12. At this time, rotate the cover body 3 to let the limiting portion 33 smoothly enter the second accommodating portion 12, after arriving at the first position, release the cover body 3, the cover body 3 may move upwards under the elastic action of the sealing piece 2 until a top face of the limiting portion 33 abuts with the limiting wall 123.

When it is necessary to dismount the cover body 3, apply a downward force upon the cover body 3, through the deformation of the sealing piece 2 to generate a gap between the limiting portion 33 and the second accommodating portion 12. At this time, rotate the cover body 3 to smoothly let the limiting portion 33 peripherally stagger with the second accommodating portion 12 and integrally locate inside the guide portion 13, at which time arrives at the second position, when it is feasible to dismount the cover body 3.

In some embodiments, a limiting structure is arranged between the limiting portion 33 and the second accommodating portion 12, and is configured to limit the cover body 3 from being staggered with and separated from the second accommodating portion 12 when the cover body 3 is located at the first position. If a device using the battery cell 600 generates relative large vibration or impact in the working process, the limiting structure may enable the limiting portion 33 and the second accommodating portion 12 to be reliably clamped at the first position, so that the limiting portion 33 is prevented from peripherally rotating and being separated from the second accommodating portion 12, the cover body 3 and the end cover 1 are connected more reliably, the sealing property of the electrolyte is improved, and the working reliability of the battery is ensured.

As shown in FIG. 20A and FIG. 21A, the limiting structure includes: a third accommodating portion 332 and a limiting protrusion portion 121, wherein the third accommodating portion 332 is arranged on one of the limiting portion 33 and the second accommodating portion 12, and the third accommodating portion 332 may be a hole or a groove; and the limiting protrusion 121 is clamped tightly with the third accommodating portion 332, and is arranged on the other one of the limiting portion 33 and the second accommodating portion 12. When the cover body 3 is located at the first position, under the elastic action of the sealing piece 2, the third accommodating portion 332 is clamped with the limiting protrusion portion 121, so that the limiting portion 33 and the second accommodating portion 12 will not be subjected to the external force such as vibration and impact and subsequently rotate or loosen; or the cover body 3 is clamped tightly through the interference fit between the third accommodating portion 332 and the limiting protrusion portion 121.

Figure 8:
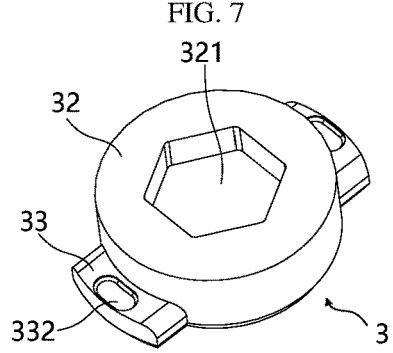
FIG. 8 is a structural schematic diagram of some embodiments of a cover body in a first embodiment from another angle.

As shown in FIG. 20A, the limiting protrusion portion 121 is arranged on the limiting wall 123 of the second accommodating portion 12; as shown in FIG. 8, the third accommodating portion 332 is arranged on the top surface of the limiting portion 33, and when the cover body 3 is located at the first position, the limiting protrusion portion 121 is embedded into the third accommodating portion 332 to limit rotation of the cover body 3.

In some embodiments, the sealing piece 2 includes a sealing column 22 inserted into the first hole 11; an end of the sealing column 22 close to an inner portion of the battery cell 600 is provided with a guide inclined surface; and a length of the guide inclined surface in an axis direction of the first hole 11 is greater than a length of the mounting part 4 in the axis direction of the first hole 11. After this arrangement, before the sealing column 22 is inserted into the first hole 11, the contact between the sealing column 22 and the first hole 11 may precede the contact between the sealing piece 2 and the outer surface of the end cover 1, so that the abrasion between the sealing piece 2 and the end cover 1 is reduced, and the sealing effect of the sealing piece 2 is ensured. Meanwhile, the guide inclined surface can guide the operation of inserting the sealing column 22 into the first hole 11, so that the operation convenience, the operation accuracy and the operation efficiency can be improved.

Another fitted structure of the cover body 3 and the end cover 1 is described below with reference to FIG. 23.

Figure 23:
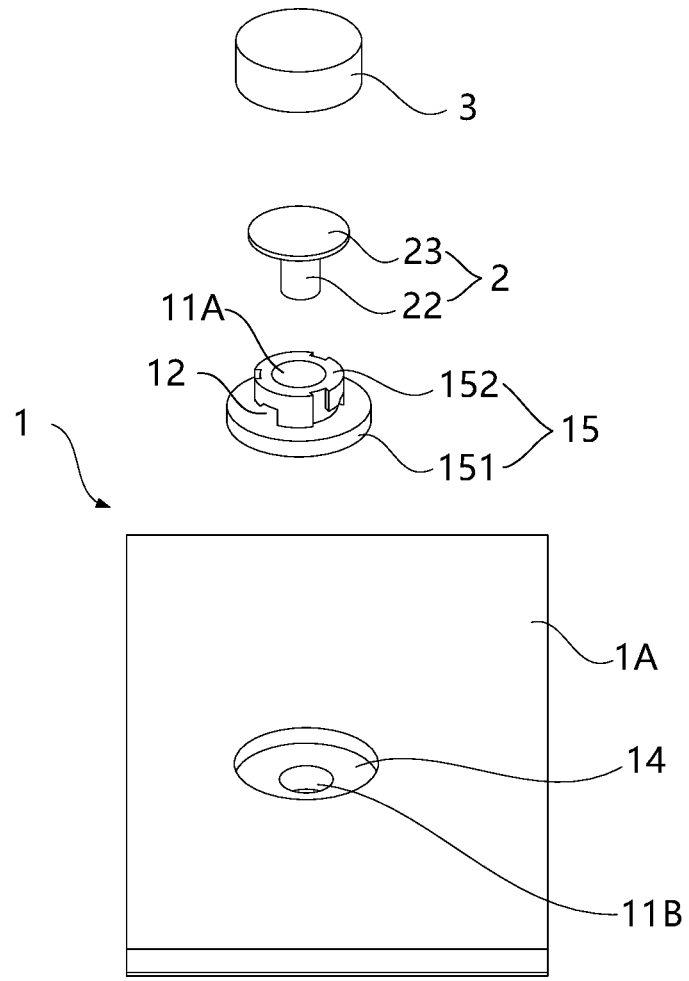
FIG. 23 is a schematic diagram of a fitted structure of an end cover, a sealing piece and a cover body in some embodiments of the present application.

As shown in FIG. 23, the end cover 1 includes an end cover body 1A and a liquid injection pedestal 15, wherein the end cover body 1A is provided with a first hole 11 and a first groove 14; and the groove bottom of the first groove 14 is provided with a hole communicating with the first hole 11.

The liquid injection pedestal 15 includes a bottom supporting plate 151 and a liquid injection portion 152 mounted on the bottom supporting plate 151. The bottom supporting plate 151 is arranged in the first groove 14, and a bottom surface of the bottom supporting plate 151 is in contact with a groove bottom surface of the first groove 14. At least part of the liquid injection portion 152 is higher than an outer surface of one side of the end cover 1 away from the inner portion of the battery cell 600.

The first hole 11 includes a first hole section 11A arranged on the liquid injection pedestal 15 and a second hole section 11B arranged on the end cover body 1A, wherein the first hole section 11A communicates with the second hole section 11B. The second accommodating portion 12 is arranged on an outer side surface of the liquid injection portion 152, a clamping portion is arranged on an inner side of the cover body 3, and the cover body 3 is shaped as a round cap.

The sealing column 22 is inserted into the first hole section 11A and the second hole section 11B, a bottom surface of the anti-thrust platform 23 abuts against a top surface of the liquid injection portion 152, the cover body 3 covers an upper part of the sealing piece 2, the clamping portion enters the second accommodating portion 12 by rotating the cover body 3, the cover body 3 and the end cover 1 are connected through the fit between the clamping portion and the second accommodating portion 12, and the sealing piece 2 is pressed between the cover body 3 and the end cover 1, so that the sealing piece 2 is fixed.

The number of the clamping portion is equal to the number of the second accommodating portion 12, such as one, two or three.

Different embodiments of the fitted structure of the sealing piece 2 and the cover body 3 in the present application are described below in detail with reference to FIG. 4 to FIG. 19B.

As shown in FIG. 4 to FIG. 9, they are structural schematic diagrams of a first embodiment.

Figure 5:
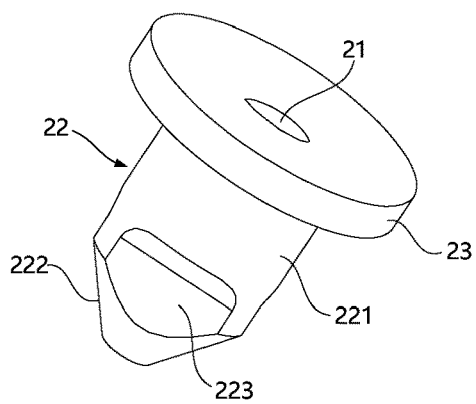
FIG. 5 is a structural schematic diagram of some embodiments of a sealing piece in a first embodiment.
Figure 6:
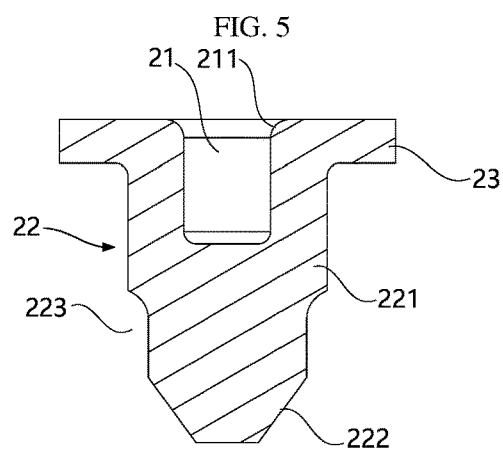
FIG. 6 is a sectional view of some embodiments of a sealing piece in a first embodiment.

In the first embodiment, as shown in FIG. 5 and FIG. 6, the sealing piece 2 is provided with a second hole 21, and the sealing piece 2 includes a sealing column 22 and an anti-thrust platform 23 connected to the sealing column 22. The sealing column 22 and the anti-thrust platform 23 may be two independent parts connected with each other; or the sealing column 22 and the anti-thrust platform 23 may also be of an integrally formed structure.

The second hole 21 extends from one end of the anti-thrust platform 23 away from the sealing column 22 to a direction close to the sealing column 22, and the second hole 21 penetrates through the anti-thrust platform 23 and extends to the sealing column 22. The second hole 21 is a blind hole.

The hole wall of the second hole 21 located at one end of the anti-thrust platform 23 away from the sealing column 22 is provided with a chamfer 211. Through the chamfer 211, the boss 31 inserted into the second hole 21 may be guided, so that the assembling efficiency is improved. The chamfer 211 is arc-shaped, and the opening area of the chamfer 211 gradually increases in a direction away from the sealing column 22, so that the boss 31 can be smoothly inserted. In addition to the chamfer 211, the second hole 21 includes an isodiametric cylindrical hole section and a reducing hole section, wherein the reducing hole section is arranged at one end of the cylindrical hole section away from the chamfer 211.

In the first embodiment, a length of the second hole 21 accounts for less than 50% of an overall length of the sealing piece 2. The length of the second hole 21 is slightly greater than a length of the boss 31.

The sealing column 22 includes a sealing main body portion 221 and a cone portion 222 connected to the sealing main body portion 221, wherein the sealing main body portion 221 and the cone portion 222 may be two relatively independent parts connected with each other, or may also be integrally formed. The cross-sectional area of the cone portion 222 gradually decreases in a direction away from the anti-thrust platform 23. One end of the cone portion 222 away from the anti-thrust platform 23 is a flat plane.

Through the cone portion 222, the sealing column 22 may be guided when being inserted into the first hole 11, so that the insertion of the sealing column 22 is facilitated, and the assembling efficiency is improved.

The sealing column 22 is further provided with a weight-reducing concave portion 223, and the weight-reducing concave portion 223 may be arranged on the sealing main body portion 221. The weight-reducing concave portion 223 extends along a direction which approaches to a central axis of the sealing main body portion 221 from an outer surface of the sealing main body portion 221. A plurality of weight-reducing concave portions 223 may be arranged in a peripheral direction of the sealing column 22, so that the overall weight of the sealing piece 2 is reduced.

The anti-thrust platform 23 is also cylindrical, and a height of the anti-thrust platform 23 is less than a height of the sealing column 22.

Figure 7:
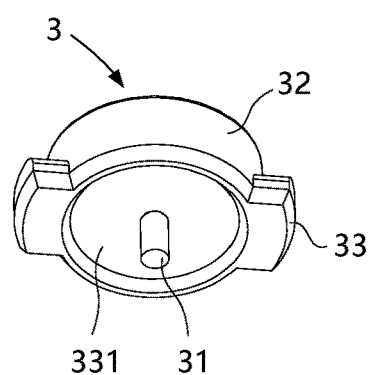
FIG. 7 is a structural schematic diagram of some embodiments of a cover body in a first embodiment.
Figure 9:
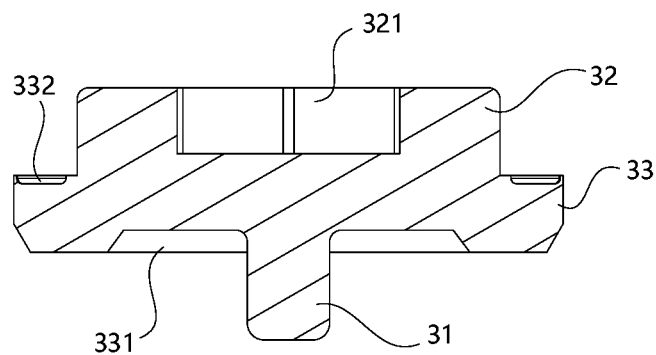
FIG. 9 is a sectional view of some embodiments of a cover body in a first embodiment.

As shown in FIG. 7 to FIG. 9, the cover body 3 is provided with a boss 31, and the cover body 3 includes a cover body main portion 32 and a limiting portion 33 connected to the cover body main portion 32. The limiting portion 33 and the cover body main portion 32 may be two relatively independent parts connected with each other, or may also be integrally formed. In the first embodiment, the periphery of the cover body main portion 32 is connected with two limiting portions 33.

A first end of the cover body main portion 32 is provided with a third groove 321 extending from an end face of the first end to an inner portion of the cover body main portion 32. For example, the section of the third groove 321 is hexagonal, so that a rotational operation on the cover body 3 by a tool is facilitated. A third accommodating portion 332 extending from a side surface of one side to an inner portion of the limiting portion 33 is arranged on one side of the limiting portion 33 close to the first end of the cover body main portion 32, for example, the cross section of the third accommodating portion is elliptic.

The boss 31 is arranged on a second end of the cover body main portion 32 opposite to the first end, a fourth accommodating portion 331 extending from the second end to the inner portion of the cover body main portion 32 is arranged at the second end of the cover body main portion 32, and the boss 31 is arranged on a bottom wall of the fourth accommodating portion 331. The boss 31 extends along a direction away from the cover body main portion 32 from the bottom wall of the fourth accommodating portion 331.

The opening area of the fourth accommodating portion 331 is greater than the cross-sectional area of the boss 31. The opening area of the fourth accommodating portion 331 is further greater than the cross-sectional area of the anti-thrust platform 23 of the sealing piece 2, so that the anti-thrust platform 23 is accommodated in the fourth accommodating portion 331. Through the fourth accommodating portion 331, a space may be reserved for the anti-thrust platform 23.

A height of the fourth accommodating portion 331 is less than or equal to the height of the anti-thrust platform 23 in an axis direction of the second hole 21. This structure may extrude the anti-thrust platform 23 when the sealing piece 2 and the cover body 3 are assembled, so that the sealing effect is improved.

In the first embodiment, the boss 31 is shaped like a cylinder, and is shaped as an isodiametric cylinder. One end of the boss 31 away from the cover body main portion 32 is provided with an arc chamfer, so that avoiding collision and subsequently generated particulates when the boss 31 is inserted into the second hole 21 is avoided.

As shown in FIG. 4, the sealing column 22 is inserted into the first hole 11, a length of the sealing column 22 is greater than a length of the first hole 11, and part of the sealing column 22 extends into one side of the end cover 1 close to the inner portion of the battery cell 600. An end face of the anti-thrust platform 23 close to the sealing column 22 is in contact with an end face of the end cover 1 away from the inner portion of the battery cell 600. The boss 31 is inserted into the second hole 21, and the anti-thrust platform 23 is accommodated in the fourth accommodating portion 331.

Figure 10:
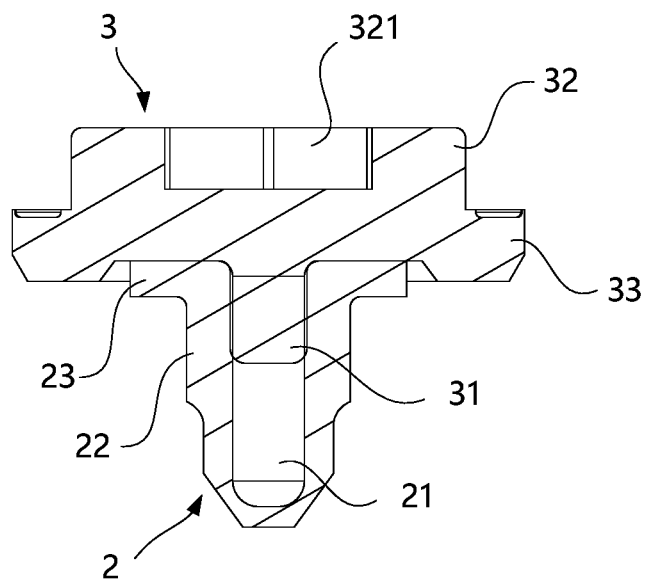
FIG. 10 is a sectional view of a fitted structure of a cover body and a sealing piece in a second embodiment.
Figure 11:
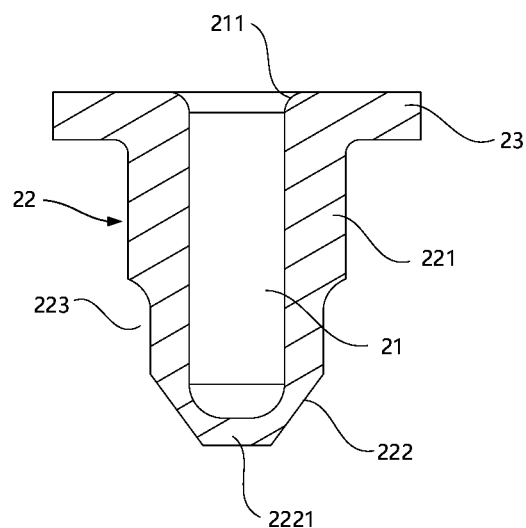
FIG. 11 is a sectional view of some embodiments of a sealing piece in a second embodiment.

As shown in FIG. 10 to FIG. 11, they are structural schematic diagrams of a second embodiment.

In the second embodiment, as shown in FIG. 11, the sealing piece 2 is provided with a second hole 21, and the sealing piece 2 includes a sealing column 22 and an anti-thrust platform 23 connected to the sealing column 22. The sealing column 22 and the anti-thrust platform 23 may be two independent parts connected with each other; or the sealing column 22 and the anti-thrust platform 23 may also be of an integrally formed structure.

The second hole 21 extends along a direction which approaches the sealing column 22 from one end of the anti-thrust platform 23 away from the sealing column 22, and the second hole 21 penetrates through the anti-thrust platform 23 and extends to the sealing column 22. The second hole 21 is a blind hole.

The second hole 21 located at one end of the anti-thrust platform 23 away from the sealing column 22 is provided with a chamfer 211. Through the chamfer 211, the boss 31 inserted into the second hole 21 may be guided, so that the assembling efficiency is improved. The chamfer 211 is arc-shaped, and the opening area of the chamfer 211 gradually increases in a direction away from the sealing column 22, so that the boss 31 can be inserted smoothly. In addition to the chamfer 211, the second hole 21 includes an isodiametric cylindrical hole section and a reducing hole section, wherein the reducing hole section is arranged at one end of the cylindrical hole section away from the chamfer 211.

In the second embodiment, a length of the second hole 21 accounts for greater than 90% of an overall length of the sealing piece 2. A thin wall 2221 is formed between a bottom wall of the second hole 21 and a bottom wall of the sealing column 22. This structure facilitates an operator to pierce the sealing piece 2 through a needle-shaped piece, so that a small hole formed by the thin wall 2221 is pierced firstly to release the gas pressure in the battery cell 600 before the sealing piece 2 is disassembled, thereby preventing impact on the operator caused by excessive internal gas pressure when the sealing piece 2 is directly disassembled.

The sealing column 22 includes a sealing main body portion 221 and a cone portion 222 connected to the sealing main body portion 221, wherein the sealing main body portion 221 and the cone portion 222 may be two relatively independent parts connected with each other, or may also be integrally formed. The cross-sectional area of the cone portion 222 gradually decreases in a direction away from the anti-thrust platform 23. One end of the cone portion 222 away from the anti-thrust platform 23 is a flat plane.

Through the cone portion 222, the sealing column 22 may be guided when being inserted into the first hole 11, so that the insertion of the sealing column 22 is facilitated, and the assembling efficiency is improved.

The sealing column 22 is further provided with a weight-reducing concave portion 223, and the weight-reducing concave portion 223 may be arranged on the sealing main body portion 221. The weight-reducing concave portion 223 extends along a direction which approaches a central axis of the sealing main body portion 221 from an outer surface of the sealing main body portion 221. A plurality of weight-reducing concave portions 223 may be arranged in a peripheral direction of the sealing column 22, so that the overall weight of the sealing piece 2 is reduced.

The anti-thrust platform 23 is also cylindrical, and a height of the anti-thrust platform 23 is less than a height of the sealing column 22.

As shown in FIG. 10, the structure of the cover body 3, and the fitting manner of the cover body 3 and the sealing piece 2 are the same as the structure of the cover body 3 in the first embodiment, which will not be elaborated again.

As shown in FIG. 12 to FIG. 14, they are structural schematic diagrams of a third embodiment.

As shown in FIG. 13, the sealing piece 2 is provided with a second hole 21, and the sealing piece 2 includes a sealing column 22 and an anti-thrust platform 23 connected to the sealing column 22. The sealing column 22 and the anti-thrust platform 23 may be two independent parts connected with each other; or the sealing column 22 and the anti-thrust platform 23 may also be of an integrally formed structure.

The second hole 21 extends along a direction which approaches the sealing column 22 from one end of the anti-thrust platform 23 away from the sealing column 22, and the second hole 21 penetrates through the anti-thrust platform 23 and extends to the sealing column 22. The second hole 21 is a blind hole.

The second hole 21 located at one end of the anti-thrust platform 23 away from the sealing column 22 is provided with a chamfer 211. Through the chamfer 211, the boss 31 inserted into the second hole 21 may be guided, so that the assembling efficiency is improved. The chamfer 211 is arc-shaped, and the opening area of the chamfer 211 gradually increases in a direction away from the sealing column 22, so that the boss 31 can be inserted smoothly.

The second hole 21 includes a first accommodating portion 212, a second accommodating part 213, a first extension portion 214 and a second extension portion 215 which are sequentially connected from a chamfer 211. In a direction perpendicular to an axis of the second hole 21, the cross-sectional area of the first accommodating portion 212 gradually increases in a direction away from the chamfer 211, the cross-sectional area of the second accommodating part 213 first increases then decreases in the direction away from the chamfer 211, the first extension portion 214 is an isodiametric cylindrical hole section, and the cross-sectional area of the first extension portion 215 gradually decreases in the direction away from the chamfer 211.

Through the first extension portion 214 and the second extension portion 215, a length of the second hole 21 accounts for greater than 90% of an overall length of the sealing piece 2. A thin wall 2221 is formed between a bottom wall of the second hole 21 and a bottom wall of the sealing column 22. This structure facilitates an operator to pierce the sealing piece 2 through a needle-shaped piece, so that a small hole formed by the thin wall 2221 is pierced firstly to release the gas pressure in the battery cell 600 before the sealing piece 2 is disassembled, thereby preventing impact on the operator caused by excessive internal gas pressure.

In the third embodiment, the length of the second hole 21 accounts for greater than 90% of the overall length of the sealing piece 2. A thin wall 2221 is formed between a bottom wall of the second hole 21 and a bottom wall of the sealing column 22. This structure facilitates an operator to pierce the sealing piece 2 through a needle-shaped piece, so that a small hole formed by the thin wall 2221 is pierced firstly to release the gas pressure in the battery cell 600 before the sealing piece 2 is disassembled, thereby preventing impact on the operator caused by excessive internal gas pressure.

The sealing column 22 includes a sealing main body portion 221 and a cone portion 222 connected to the sealing main body portion 221, wherein the sealing main body portion 221 and the cone portion 222 may be two relatively independent parts and be connected with each other, or may also be integrally formed. The cross-sectional area of the cone portion 222 gradually decreases in a direction away from the anti-thrust platform 23. One end of the cone portion 222 away from the anti-thrust platform 23 is a flat plane.

Through the cone portion 222, the sealing column 22 may be guided when being inserted into the first hole 11, so that the insertion of the sealing column 22 is facilitated, and the assembling efficiency is improved.

The sealing column 22 is further provided with a weight-reducing concave portion 223, and the weight-reducing concave portion 223 may be arranged on the sealing main body portion 221. The weight-reducing concave portion 223 extends along a direction which approaches a central axis of the sealing main body portion 221 from an outer surface of the sealing main body portion 221. A plurality of weight-reducing concave portions 223 may be arranged in a peripheral direction of the sealing column 22, so that the overall weight of the sealing piece 2 is reduced.

The anti-thrust platform 23 is also cylindrical, and a height of the anti-thrust platform 23 is less than a height of the sealing column 22.

As shown in FIG. 14, the cover body 3 is provided with a boss 31, and the cover body 3 includes a cover body main portion 32 and a limiting portion 33 connected to the cover body main portion 32. The limiting portion 33 and the cover body main portion 32 may be two relatively independent parts connected with each other, or may also be integrally formed. In the third embodiment, the periphery of the cover body main portion 32 is connected with two limiting portions 33.

A first end of the cover body main portion 32 is provided with a third groove 321 extending from an end face of the first end to an inner portion of the cover body main portion 32. For example, the section of the third groove 321 is hexagonal, so that a rotational operation on the cover body 3 by a tool is facilitated. A third accommodating portion 332 extending from a side surface of one side to an inner portion of the limiting portion 33 is arranged on one side of the limiting portion 33 close to the first end of the cover body main portion 32, for example, the cross section of the third accommodating portion is elliptic.

The boss 31 is arranged on a second end of the cover body main portion 32 opposite to the first end, a fourth accommodating portion 331 extending from the second end to the inner portion of the cover body main portion 32 is arranged at the second end of the cover body main portion 32, and the boss 31 is arranged on a bottom wall of the fourth accommodating portion 331. The boss 31 extends from the bottom wall of the fourth accommodating portion 331 to a direction away from the cover body main portion 32.

The opening area of the fourth accommodating portion 331 is greater than the cross-sectional area of the boss 31. The opening area of the fourth accommodating portion 331 is further greater than the cross-sectional area of the anti-thrust platform 23 of the sealing piece 2, so that the anti-thrust platform 23 is accommodated in the fourth accommodating portion 331. Through the fourth accommodating portion 331, a space may be reserved for the anti-thrust platform 23.

A height of the fourth accommodating portion 331 is less than or equal to the height of the anti-thrust platform 23 in an axis direction of the second hole 21. This structure may extrude the anti-thrust platform 23 when the sealing piece 2 and the cover body 3 are assembled, so that the sealing effect is improved.

In the third embodiment, the boss 31 includes a first inserting portion 311; in a direction perpendicular to the axis of the second hole 21, the cross-sectional area of the first inserting portion 311 gradually increases in a direction away from the cover body main portion 32; and the section of the first inserting portion 311 in an axis direction of the second hole 21 is trapezoidal.

One end of the first inserting portion 311 away from the cover body main portion 32 is provided with an arc chamfer, so that prevent the occurrence of collision when the boss 31 is inserted into the second hole 21 from generating particulates.

As shown in FIG. 12, the first inserting portion 311 is inserted into the first accommodating portion 212 of the second hole 21, there isn't any solid structure inserted into the first extension portion 214 and the second extension portion 215, and the anti-thrust platform 23 is accommodated in the fourth accommodating portion 331. This structure may effectively limit separation between the sealing piece 2 and the cover body 3 through the fit between the first inserting portion 311 and the first accommodating portion 212.

As shown in FIG. 15 to FIG. 18, they are structural schematic diagrams of a fourth embodiment.

Figure 16:
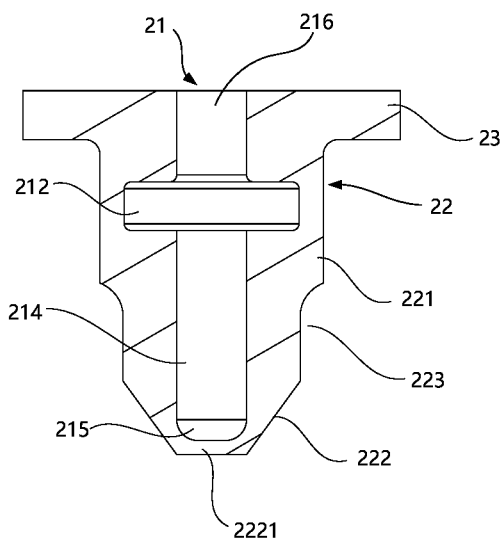
FIG. 16 is a sectional view of some embodiments of a sealing piece in a fourth embodiment.

As shown in FIG. 16, the sealing piece 2 is provided with a second hole 21, and the sealing piece 2 includes a sealing column 22 and an anti-thrust platform 23 connected to the sealing column 22. The sealing column 22 and the anti-thrust platform 23 may be two independent parts connected with each other; or the sealing column 22 and the anti-thrust platform 23 may also be of an integrally formed structure.

The second hole 21 extends along a direction which approaches the sealing column 22 from one end of the anti-thrust platform 23 away from the sealing column 22, and the second hole 21 penetrates through the anti-thrust platform 23 and extends to the sealing column 22. The second hole 21 is a blind hole.

The second hole 21 located at one end of the anti-thrust platform 23 away from the sealing column 22 is provided with a chamfer 211. Through the chamfer 211, the boss 31 inserted into the second hole 21 may be guided, so that the assembling efficiency is improved. The chamfer 211 is arc-shaped, and the opening area of the chamfer 211 gradually increases in a direction away from the sealing column 22, so that the boss 31 can be inserted smoothly.

The second hole 21 includes a third extension portion 216, a first accommodating portion 212, a first extension portion 214 and a second extension portion 215 which are sequentially connected from a chamfer 211; in a direction perpendicular to an axis of the second hole 21, the third extension portion 216 is an isodiametric cylindrical hole section, and the first accommodating portion 212 is also an isodiametric cylindrical hole section, but a diameter of the first accommodating portion 212 is greater than a diameter of the third extension portion 216, the first extension portion 214 is an isodiametric cylindrical hole section, a diameter of the first extension portion 214 is equal to the diameter of the third extension portion 216, and the cross-sectional area of the second extension portion 215 gradually decreases along a direction away from the chamfer 211.

Through the first extension portion 214 and the second extension portion 215, a length of the second hole 21 accounts for greater than 90% of an overall length of the sealing piece 2. A thin wall 2221 is formed between a bottom wall of the second hole 21 and a bottom wall of the sealing column 22. This structure facilitates an operator to pierce the sealing piece 2 through a needle-shaped piece, so that a small hole formed by the thin wall 2221 is pierced firstly to release the gas pressure in the battery cell 600 before the sealing piece 2 is disassembled, thereby preventing impact on the operator caused by excessive internal gas pressure.

In the fourth embodiment, the length of the second hole 21 accounts for greater than 90% of the overall length of the sealing piece 2. A thin wall 2221 is formed between a bottom wall of the second hole 21 and a bottom wall of the sealing column 22. This structure facilitates an operator to pierce the sealing piece 2 through a needle-shaped piece, so that a small hole formed by the thin wall 2221 is pierced firstly to release the gas pressure in the battery cell 600 before the sealing piece 2 is disassembled, thereby preventing impact on the operator caused by excessive internal gas pressure.

The sealing column 22 includes a sealing main body portion 221 and a cone portion 222 connected to the sealing main body portion 221, wherein the sealing main body portion 221 and the cone portion 222 may be two relatively independent parts connected with each other, or may also be integrally formed. The cross-sectional area of the cone portion 222 gradually decreases in a direction away from the anti-thrust platform 23. One end of the cone portion 222 away from the anti-thrust platform 23 is a flat plane.

Through the cone portion 222, the sealing column 22 may be guided when being inserted into the first hole 11, so that the insertion of the sealing column 22 is facilitated, and the assembling efficiency is improved.

The sealing column 22 is further provided with a weight-reducing concave portion 223, and the weight-reducing concave portion 223 may be arranged on the sealing main body portion 221. The weight-reducing concave portion 223 extends from an outer surface of the sealing main body portion 221 to a direction close to a center axis of the sealing main body portion 221. A plurality of weight-reducing concave portions 223 may be arranged in a peripheral direction of the sealing column 22, so that the overall weight of the sealing piece 2 is reduced.

The anti-thrust platform 23 is also cylindrical, and a height of the anti-thrust platform 23 is less than a height of the sealing column 22.

Figure 17:
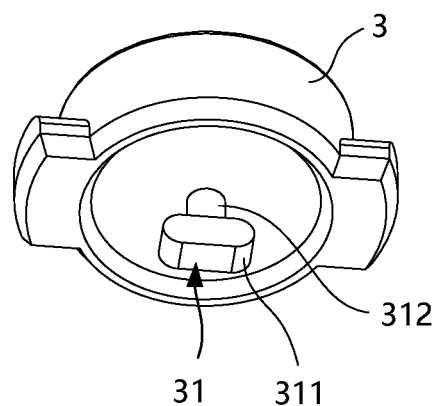
FIG. 17 is a structural schematic diagram of some embodiments of a cover body in a fourth embodiment.
Figure 18:
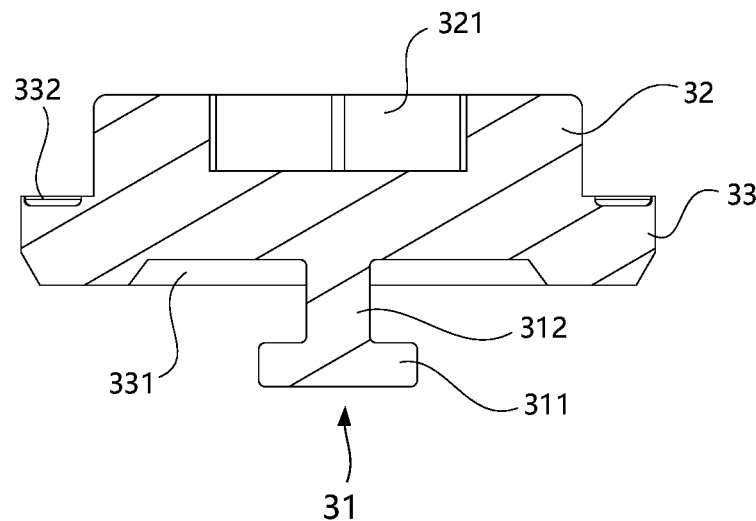
FIG. 18 is a sectional view of some embodiments of a cover body in a fourth embodiment.

As shown in FIG. 17 and FIG. 18, the cover body 3 is provided with a boss 31, and the cover body 3 includes a cover body main portion 32 and a limiting portion 33 connected to the cover body main portion 32. The limiting portion 33 and the cover body main portion 32 may be two relatively independent parts connected with each other, or may also be integrally formed. In the fourth embodiment, the periphery of the cover body main portion 32 is connected with two limiting portions 33.

A first end of the cover body main portion 32 is provided with a third groove 321 extending from an end face of the first end to an inner portion of the cover body main portion 32. For example, the section of the third groove 321 is hexagonal, so that a rotational operation on the cover body 3 by a tool is facilitated. A third accommodating portion 332 extending from a side surface of one side to an inner portion of the limiting portion 33 is arranged on one side of the limiting portion 33 close to the first end of the cover body main portion 32, for example, the cross section of the third accommodating portion is elliptic.

The boss 31 is arranged on a second end of the cover body main portion 32 opposite to the first end, a fourth accommodating portion 331 extending from the second end to the inner portion of the cover body main portion 32 is arranged at the second end of the cover body main portion 32, and the boss 31 is arranged on a bottom wall of the fourth accommodating portion 331. The boss 31 extends from the bottom wall of the fourth accommodating portion 331 to a direction away from the cover body main portion 32.

The opening area of the fourth accommodating portion 331 is greater than the cross-sectional area of the boss 31. The opening area of the fourth accommodating portion 331 is further greater than the cross-sectional area of the anti-thrust platform 23 of the sealing piece 2, so that the anti-thrust platform 23 can be accommodated in the fourth accommodating portion 331. Through the fourth accommodating portion 331, a space may be reserved for the anti-thrust platform 23.

A height of the fourth accommodating portion 331 is less than or equal to the height of the anti-thrust platform 23 in an axis direction of the second hole 21. This structure may extrude the anti-thrust platform 23 when assembling the sealing piece 2 and the cover body 3, so that the sealing effect is improved.

In the fourth embodiment, the boss 31 includes a second insertion portion 312 connected to the cover body main portion 32, and a first inserting portion 311 connected to the second insertion portion 312, wherein the second insertion portion 312 is connected to one end of the first inserting portion 311 away from the cover body main portion 32. Both the first inserting portion 311 and the second insertion portion 312 are shaped as isodiametric cylinders, and a diameter of the first inserting portion 311 is greater than a diameter of the second insertion portion 312. A length of the first inserting portion 311 is less than a length of the second insertion portion 312.

One end of the first inserting portion 311 away from the cover body main portion 32 is provided with an arc chamfer, so that the collision and subsequently generated particulars can be avoided when the boss 31 is inserted into the second hole 21.

Figure 15:
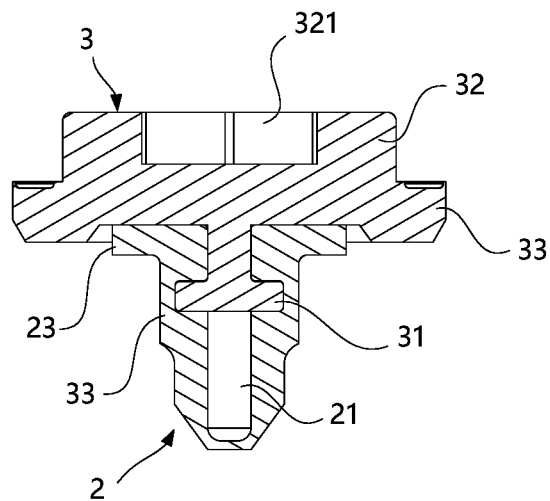
FIG. 15 is a sectional view of a fitted structure of a cover body and a sealing piece in a fourth embodiment.

As shown in FIG. 15, the second insertion portion 312 is inserted into the third extension portion 216, the first inserting portion 311 is inserted into the first accommodating portion 212 of the second hole 21, the first extension portion 214 and the second extension portion 215 are not inserted with any solid structure, and the anti-thrust platform 23 is accommodated in the fourth accommodating portion 331. This structure may effectively limit separation between the sealing piece 2 and the cover body 3 through the fit between the first inserting portion 311 and the first accommodating portion 212.

As shown in FIG. 19A and FIG. 19B, they are structural schematic diagrams of a fifth embodiment.

In the fifth embodiment, the sealing piece 2 is provided with a second hole 21, and the sealing piece 2 includes a sealing column 22 and an anti-thrust platform 23 connected to the sealing column 22. In a direction perpendicular to an axis of the second hole 21, the cross section of the sealing column 22 is elliptical, that is, the sealing column 22 is a non-rotating body. This structure may effectively prevent the sealing column 22 from rotating relative to the end cover 1 and reduce the abrasion of the sealing piece 2.

Other structures on the sealing piece 2 and the structure of the cover body 3 may be referenced to the aforementioned first to fourth embodiments, which will not be elaborated again.

Figure 24:
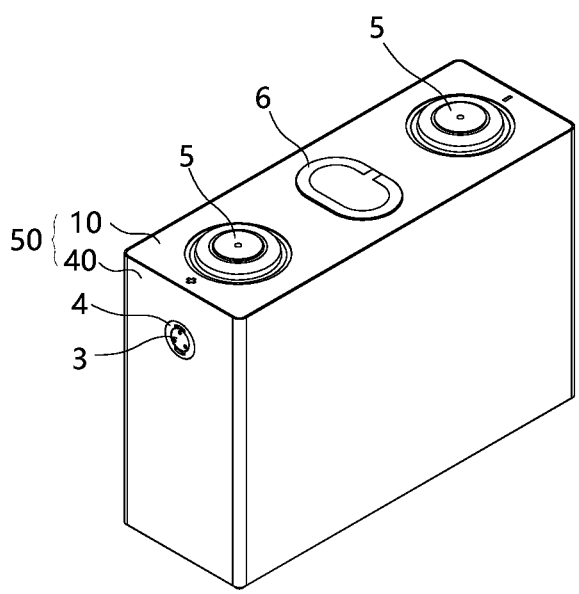
FIG. 24 is a structural schematic diagram of some embodiments of an outer shell assembly applied to a battery cell according to the present application.

Based on the improvement of the end cover assembly 10 in the above embodiments, the present application further provides a shell assembly, applied to a battery cell 600. As shown in FIG. 24, the shell assembly includes a shell 40, a sealing piece 2 and a cover body 3, wherein the shell 40 is configured to be connected to the end cover 1 to form an outer shell 50 of the battery cell 600; the shell 40 is provided with a first hole 11 for injecting electrolyte; the sealing piece 2 is configured to seal the first hole 11; and the cover body 3 is configured to cover at least part of the sealing piece 2, and the cover body 3 is rotatable relative to the end cover 1 to realize detachable connection between the cover body 3 and the end cover 1.

One of the sealing piece 2 and the cover body 3 is provided with a second hole 21, and the other one of the sealing piece 2 and the cover body 3 is provided with a boss 31. The boss 31 is configured to be inserted into the second hole 21, and the boss 31 and the second hole 21 are relatively rotatable, so that the sealing piece 2 and the cover body 3 are rotatably connected.

In some embodiments, the first hole 11 is formed on a side surface of the shell 40, and the sealing piece 2 and the cover body 3 are correspondingly arranged on side surface of the shell 40. This structure may facilitate injection of the electrolyte, and may provide a large space for the arrangement of an electrode terminal 5 and an anti-explosion component 6 on the end cover 1.

One difference between the shell assembly and the end cover assembly 10 is that in the shell assembly, the first hole 11 is formed on the shell 40; but in the end cover assembly 10, the first hole 11 is formed on the end cover 1. In the shell assembly, the structures of the sealing piece 2 and the cover body 3 may be referenced to the structures of the sealing piece 2 and the cover body 3 in the end cover assembly 10, which will not be elaborated herein.

Based on the above end cover assembly 10 or shell assembly, the present application further provides a battery cell 600.

In some embodiments, the battery cell 600 provided by the present application includes an electrode assembly 30 and an outer shell 50 for accommodating the electrode assembly 30, wherein the outer shell 50 includes a shell 40 and an end cover assembly 10; an end of the shell 40 is provided with an opening 401; and the end cover assembly 10 covers the opening 401 of the end of the shell 40.

In some other embodiments, the battery cell 600 provided by the present application includes an electrode assembly 30 and an outer shell 50 for accommodating the electrode assembly 30, wherein the outer shell 50 includes an end cover 1 and a shell assembly; an end of the shell 40 is provided with an opening 401; and the end cover 1 covers the opening 401 of the end of the shell 40.

In the battery cell 600 provided by the present application, the sealing piece 2 and the cover body 3 are rotatably connected, and the sealing piece 2 and the cover body 3 may be assembled or disassembled as a whole, so that the operation steps are greatly simplified, the operation time is shortened, and the operation efficiency is improved.

As shown in FIG. 25, the present application further provides a liquid injection method for a battery cell 600. The liquid injection method for the battery cell includes:

step S101: injecting electrolyte through a first hole 11 on an outer shell 50 of the battery cell 600;

step S102: taking a sealing piece 2 and a cover body 3 which are kept in a connected state to the first hole 11, sealing the first hole 11 through the sealing piece 2 when the sealing piece 2 and the cover body 3 are kept in the connected state, and covering at least part of the sealing piece 2 through the cover body 3; and step S103: rotating the cover body 3 relative to the sealing piece 2 to realize relative fixation between the cover body 3 and the outer shell 50.

When assembling the sealing piece 2 and the cover body 3, first take the sealing piece 2 and the cover body 3 which are kept in the connected state to the first hole 11, as compared with the operation step of first taking the sealing piece 2 and then taking the cover body 3, the taking time can be greatly saved. Meanwhile, the sealing piece 2 and the cover body 3 can be pre-assembled as a whole, which can save the time of assembling the sealing piece 2 and the cover body 3 for sealing after liquid injection, so that the assembly efficiency is improved.

In some embodiments, the liquid injection method further includes:

removing the cover body 3 and the sealing piece 2 which are kept in the connected state from the outer shell 50.

When the cover body 3 and the sealing piece 2 are disassembled, the cover body 3 and the sealing piece 2 may be removed integrally. As compared with a manner of disassembling one by one, the operation steps can be obviously simplified, and the operation efficiency can be improved.

In some embodiments, the sealing piece 2 is provided with a second hole 21, the cover body 3 is provided with a boss 31, the boss 31 is inserted into the second hole 21, and the second hole 21 is a blind hole. Before the electrolyte is injected through the first hole 11 on the outer shell 50 of the battery cell 600, the liquid injection method further includes:

piercing a bottom wall of the second hole 21, so that the second hole 21 communicates an inner portion of the battery cell 600 with an external environment, thereby releasing an inner pressure of the battery cell 600; and removing the cover body 3 and the sealing piece 2 from the outer shell 50.

In this embodiment, through adding a fashion of piercing the bottom wall of the second hole 21, in advance of removing the cover body 3 and the sealing piece 2 from the outer shell 50 to open the first hole 11, the inner gas pressure of the battery cell 600 can be released previously, thereby avoiding impact or injury to operators caused by excessive gas pressure, and preventing loss of the electrolyte caused by the fact that the electrolyte rushes out of the battery cell 600 under the gas pressure.

In some embodiments, the liquid injection method further includes:

rotating the cover body 3 from a first position to a second position, so that a limiting portion 33 of the cover body 3 is staggered with a second accommodating portion 12 on one side of the outer shell 50 away from the inner portion of the battery cell 600 in a circumferential direction of the first hole 11; and rotating the cover body 3 from the second position to the first position, so that the limiting portion 33 enters the second accommodating portion 12, thereby limiting the cover body 3 and the sealing piece 2 from being separated from the outer shell 50.

In this embodiment, a detachable connection between the cover body 3 and the end cover 1 realized through rotation, thus operation is facilitated. On the premise that the cover body 3 and the end cover 1 are connected or disassembled through rotation, the cover body 3 and the sealing piece 2 are rotatably connected, so that during the process that the cover body 3 rotates relative to the end cover 1, the cover body 3 rotates relative to the sealing piece 2 at the same time, thereby being beneficial for keeping relative fixation between the sealing piece 2 and the end cover 1, reducing the abrasion between the sealing piece 2 and the end cover 1, and ensuring the sealing effect of the sealing piece 2.

In some embodiments, the liquid injection method further includes:

rotating the cover body 3 from a first position to a second position, so the limiting portion is staggered with the second accommodating portion 12 in a peripheral direction of the first hole 11; and removing the cover body 3 and the sealing piece 2 which are kept in the connected state from the outer shell 50.

Figure 26:
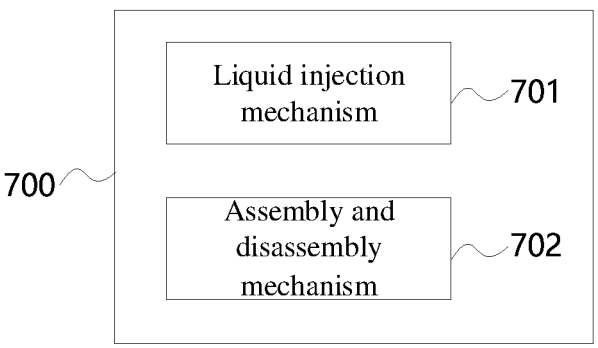
FIG. 26 is a composition schematic diagram of some embodiments of a liquid injection device according to the present application.

As shown in FIG. 26, the present application further provides a liquid injection device 700, applied to a battery cell 600 and including:

a liquid injection mechanism 701, configured to inject electrolyte into an outer shell 50 through a first hole 11 formed on the outer shell 50; and an assembly and disassembly mechanism 702, configured to take a sealing piece 2 and a cover body 3 which are kept in a connected state to the first hole 11 before the first hole 11 is sealed by the sealing piece 2, seal the first hole 11 through the sealing piece 2 when the sealing piece 2 and the cover body 3 are kept in the connected state, cover at least part of the sealing piece 2 through the cover body 3, and drive the cover body 3 to rotate relative to the sealing piece 2 after the sealing piece 2 is fitted with the first hole 11 so as to realize relative fixation between the cover body 3 and the outer shell 50.

In this embodiment, the sealing piece 2 and the cover body 3 are stilled kept in the connected state, and the sealing piece 2 and the cover body 3 can be integrally disassembled and mounted rapidly by the assembly and disassembly mechanism 702, so the operation efficiency is high.

The protection topics in the present application and the features in the embodiments may be referenced to each other. In a case where the structures allow, those skilled in the art may flexibly combine the technical features in different embodiments to form more embodiments.

The end cover assembly of the battery, the battery and the power consumption device which are provided by the present application are described in detail above. The principle and implementation manner of the present application are illustrated by applying specific embodiments herein. The description of the above embodiments is only used to help understand the method and its core idea of the present application. It should be noted that for those of ordinary skill in the art, several improvements and modifications may be made to the present application without departing from the principle of the present application, and these improvements and modifications should also fall within the protection scope of the claims of the present application.

The invention claimed is:

1. An end cover assembly for a battery cell, comprising:
    an end cover, provided with a first hole for injecting electrolyte;
    a sealing piece, configured to seal the first hole, and comprising a sealing column inserted into the first hole; and
    a cover body, configured to cover at least part of the sealing piece, the cover body being rotatable relative to the end cover to realize detachable connection between the cover body and the end cover, and separation between the cover body and the end cover being realized by rotation of the cover body,
    wherein one of the sealing piece and the cover body is provided with a second hole, and the other one of the sealing piece and the cover body is provided with a boss; and the boss is configured to be inserted into the second hole, and the boss and the second hole are relatively rotatable to realize rotatable connection between the sealing piece and the cover body; and
    wherein the sealing column is a non-rotating body and a shape of the first hole is fitted with the sealing piece; or the sealing column is in interference fit with the first hole, the boss is in interference fit with the second hole, and a friction coefficient of a contact surface between the sealing column and the first hole is greater than a friction coefficient of a contact surface between the boss and the second hole;
    wherein the end cover is provided with a second accommodating portion arranged in a circumferential direction of the first hole, the second accommodating portion is located on one side of the end cover away from an inner portion the battery cell; the cover body comprises a limiting portion; when the cover body rotates to a first position, the limiting portion is located in the second accommodating portion to limit separation between the cover body and the end cover; and when the cover body rotates to a second position, the limiting portion and the second accommodating portion are staggered in a circumferential direction of the first hole to realize separation between the cover body and the end cover; the boss and the second hole are configured to be relatively rotatable at least during the process that the cover body rotates from the first position to the second position.

2. The end cover assembly according to claim 1, wherein the boss is connected to the second hole in an interference fit.

3. The end cover assembly according to claim 2, wherein the second hole is a blind hole.

4. The end cover assembly according to claim 1, wherein the boss comprises a first inserting portion, a first accommodating portion is formed on a hole wall of the second hole, and the first inserting portion is accommodated in the first accommodating portion to limit separation between the sealing piece and the cover body.

5. The end cover assembly according to claim 4, wherein in a direction perpendicular to an axis of the second hole, a cross-sectional area of the first accommodating portion gradually increases in a direction away from an inserted end of the second hole, and the first inserting portion is fitted with the first accommodating portion to limit separation between the sealing piece and the cover body.

6. The end cover assembly according to claim 1, wherein the sealing piece and the end cover are relatively fixed in a peripheral direction of the first hole.

7. The end cover assembly according to claim 1, wherein a rotation axis of the cover body relative to the sealing piece is collinear with an axis of the first hole.

8. The end cover assembly according to claim 1, wherein the sealing piece further comprises an anti-thrust platform connected to the sealing column, the anti-thrust platform is located between the cover body and the end cover, and the anti-thrust platform is fitted with an end face of the first hole.

9. The end cover assembly according to claim 1, wherein the boss is a rotating body.

10. The end cover assembly according to claim 1, wherein the end cover further comprises a guide portion communicating with the second accommodating portion; and the limiting portion is configured to enter the second accommodating portion through the guide portion, or to be separated from the end cover through the guide portion; the end cover comprises an end cover body and a mounting part; the mounting part is arranged on a surface of the end cover body and is arranged around the first hole, the second accommodating portion is arranged at the mounting part, or the mounting part and the end cover body enclose to form the second accommodating portion; the sealing piece comprises a sealing column inserted into the first hole; an end of the sealing column close to an inner portion of the battery cell is provided with a guide inclined surface; and a length of the guide inclined surface in an axis direction of the first hole is greater than a length of the mounting part in the axis direction of the first hole.

11. A battery cell, comprising:
an electrode assembly and an outer shell for accommodating the electrode assembly, wherein the outer shell comprises a shell and the end cover assembly as defined in claim 1, an end of the shell is provided with an opening, and the end cover assembly covers the opening of the end of the shell.

12. A shell assembly for a battery cell, comprising:
a shell, configured to be connected to an end cover to form an outer shell of the battery cell, the shell being provided with a first hole for injecting electrolyte;
a sealing piece, configured to seal the first hole, and comprising a sealing column inserted into the first hole; and
a cover body, configured to cover at least part of the sealing piece, the cover body being rotatable relative to the end cover to realize detachable connection between the cover body and the end cover, and separation between the cover body and the end cover being realized by rotation of the cover body,
wherein one of the sealing piece and the cover body is provided with a second hole, and the other one of the sealing piece and the cover body is provided with a boss; and the boss is configured to be inserted into the second hole, and the boss and the second hole are relatively rotatable to realize rotatable connection between the sealing piece and the cover body;
and wherein the sealing column is a non-rotating body and a shape of the first hole is fitted with the sealing piece; or the sealing column is in interference fit with the first hole, the boss is in interference fit with the second hole, and a friction coefficient of a contact surface between the sealing column and the first hole is greater than a friction coefficient of a contact surface between the boss and the second hole;
wherein the end cover is provided with a second accommodating portion arranged in a circumferential direction of the first hole, the second accommodating portion is located on one side of the end cover away from an inner portion of the battery cell; the cover body comprises a limiting portion; when the cover body rotates to a first position, the limiting portion is located in the second accommodating portion to limit separation between the cover body and the end cover;
and when the cover body rotates to a second position, the limiting portion and the second accommodating portion are staggered in a circumferential direction of the first hole to realize separation between the cover body and the end cover; the boss and the second hole are configured to be relatively rotatable at least during the process that the cover body rotates from the first position to the second position.

13. A battery cell, comprising:
an electrode assembly and an outer shell for accommodating the electrode assembly, wherein the outer shell comprises an end cover and the shell assembly as defined in claim 12, an end of the shell is provided with an opening, and the end cover covers the opening of the end of the shell.

\* \* \* \* \*